United States Patent [19]

Schiflett et al.

[11] Patent Number: 5,642,327
[45] Date of Patent: Jun. 24, 1997

[54] METHOD FOR CREATING A GAIN FUNCTION FOR SEISMIC DATA AND METHOD FOR PROCESSING SEISMIC DATA

[75] Inventors: Larry J. Schiflett, Kingwood; Michael P. Thornton, Houston, both of Tex.

[73] Assignee: Exxon Production Research Company, Houston, Tex.

[21] Appl. No.: 255,484

[22] Filed: Jun. 8, 1994

[51] Int. Cl.$^6$ ........................................ G01V 1/00
[52] U.S. Cl. ........................ 367/47; 367/38; 364/421
[58] Field of Search ...................... 367/47, 38; 364/421

[56] References Cited

U.S. PATENT DOCUMENTS

| | | | |
|---|---|---|---|
| 2,241,874 | 5/1941 | Zuschlag | 181/0.5 |
| 3,496,531 | 2/1970 | Sullivan et al. | 367/38 |
| 3,671,930 | 6/1972 | Mateker, Jr. | 340/15.5 |
| 3,685,046 | 8/1972 | Howlett | 367/38 |
| 3,714,621 | 1/1973 | Waters | 364/421 |
| 3,784,967 | 1/1974 | Graul | 364/421 |
| 4,208,732 | 6/1980 | Ruehle | 364/421 |
| 4,293,933 | 10/1981 | Park et al. | 367/25 |
| 4,312,050 | 1/1982 | Lucas | 367/44 |
| 4,339,810 | 7/1982 | Nichols et al. | 367/47 |
| 4,601,023 | 7/1986 | Bowman | 367/47 |
| 4,636,993 | 1/1987 | Lumley et al. | 367/47 |
| 4,658,383 | 4/1987 | Zimmer | 367/29 |
| 4,679,174 | 7/1987 | Gelfand | 367/73 |
| 4,780,859 | 10/1988 | Hadidi et al. | 367/43 |
| 4,794,573 | 12/1988 | Bell et al. | 367/57 |
| 4,884,247 | 11/1989 | Hadidi et al. | 367/43 |
| 4,893,694 | 1/1990 | Houck et al. | 181/111 |
| 4,964,102 | 10/1990 | Kelly et al. | 367/47 |
| 5,095,466 | 3/1992 | Julien et al. | 367/24 |
| 5,189,644 | 2/1993 | Wood | 367/38 |
| 5,197,038 | 3/1993 | Chang et al. | 367/28 |
| 5,216,638 | 6/1993 | Wright | 367/47 |
| 5,237,538 | 8/1993 | Linville, Jr. et al. | 367/38 |

OTHER PUBLICATIONS

Data Reduction And Error Analysis For The Physical Sciences, Philip R. Bevington, McGraw-Hill Book Company, at 135-187.

*Primary Examiner*—Michael J. Carone
*Assistant Examiner*—Theresa M. Wesson
*Attorney, Agent, or Firm*—J. M.(Mark) Gilbreth

[57] ABSTRACT

Disclosed is a method for creating a gain function for seismic data and to processing methods for utilizing such a gain function. The method of creating the gain function generally includes representing the seismic data as a plot of the logarithm of amplitude versus time. Various order polynomial functions are subsequently fitted to the plotted seismic data. The best fitting polynomial is then selected from these various order polynomials, the inverse of which is the gain function. This gain function can be utilized in a seismic processing method.

19 Claims, 23 Drawing Sheets

METHOD FOR CREATING A GAIN FUNCTION FOR SEISMIC DATA AND METHOD FOR PROCESSING SEISMIC DATA

BACKGROUND OF THE INVENTION

1. Field of the Invention

The present invention relates to a method for processing seismic data and to a method for creating a gain curve for seismic data. In another aspect, the present invention relates to a method for processing seismic data to compensate for seismic transmission loss caused by the subsurface, and to a method for creating a gain curve of the seismic transmission loss. In yet another aspect, the present invention relates to a method for processing seismic data to compensate for seismic transmission loss caused by the subsurface by utilizing a fitted decay curve, and to a method for creating such a fitted decay curve. In still another aspect, the present invention relates to a method for processing seismic data to compensate for seismic transmission loss caused by the subsurface by utilizing a fitted decay curve, while reasonably maintaining the temporal and spatial relationships of the seismic data, and to a method for creating such a gain curve.

2. Description of the Related Art

Seismic exploration generally involves generating seismic pulses at the surface of the earth by means of one or more seismic sources. The seismic pulses travel downwardly into the earth with a fractional amount being reflected and/or refracted due to differences in elastic properties at the interface of various subterranean formations.

Detectors, such as seismometers, geophones or hydrophones, produce analog electrical seismic signals or seismic trace signals in response to detected seismic wave reflections and/or refractions. The analog electric seismic signals or seismic trace signals from the detectors can then be recorded. Alternatively, the analog seismic signals or seismic trace signals from the detectors can be sampled and digitized prior to being recorded. The seismic data recorded in either manner are subsequently processed and analyzed to determine the nature and structure of the subterranean formations.

From the recorded data, a seismic section is generated. A seismic section is a seismic image depicting the subsurface layering of a section of earth along a seismic line of profile. The seismic section is an important tool which the geologist studies to determine the nature of the earth's subsurface formations. However, before an array of seismic samples can be converted into a seismic section which can be interpreted by the geologist, the seismograms must be processed to reduce the degradation due to noise.

Seismic interpretation generally involves the study of the behavior of arrival times, amplitudes, velocities, frequencies, and character of the reflections from target horizons. Any changing or anomalous behavior is of particular interest.

It is well known and documented that the amplitude of a seismic signal decays as it propagates through the earth. Further, this amplitude decay will be frequency dependent in that the higher frequency components tend to suffer greater amplitude attenuation particularly at later arrival times. Generally several factors are viewed as contributing to the amplitude attenuation such as geometrical spreading, reflection absorption, scattering and various other transmission loss mechanisms.

This unwanted amplitude attenuation effect can distort or even ruin the seismic data by obscuring or masking seismic events related to the reflections and/or refractions from the subterranean formations.

Prior art methods for processing seismic data to compensate for such amplitude attenuation effects exist.

Amplitude decay typically has been compensated for by application of an inverse gain correction in the form of a programmed gain curve, automatic gain control circuit, exponential gain or other similar method. Such methods correct for amplitude decay as a function of time over the time span of the seismic trace by systematically amplifying the later arriving signals. Additionally, a family of gain corrections keyed to the source-to-receiver distance are sometimes applied, resulting in a scaling as a function of time and position.

Methods such as automatic gain control or exponential gain utilize a scalar that scales a statistical measure of amplitude over a window to some constant value. The length of the scaling window will vary from a few hundred milliseconds to total trace length. The resulting trace had little amplitude variation from zero time to the end of the data. These methods distort both temporal and spatial amplitude relationship along the seismic line because every trace window is scaled to the same constant. An alternative way of computing the transmission loss in the data is to multiply each trace by a single exponential. This method preserves lateral amplitude relationships but may not compensate for transmission loss because it assumes a constant rate of decay over the entire section.

Distortion of the temporal and/or spatial amplitude relationships makes itself very evident in those cases in which well data is available as a confirmation or check of the seismic processing.

U.S. Pat. No. 3,671,930, issued Jun. 20, 1972 to Mateker, Jr. discloses a method of seismographic exploration by determining the attenuation of reflected seismic signals in a geologic section at a first station and a reference station. The reference station recording is converted to a reflectivity function, and the first station recording is divided by the reflectivity function to obtain a desired amplitude function. The logarithm of the desired amplitude function is then determined at a plurality of discrete travel times; and the value of each logarithm is divided by the corresponding value of the discrete travel time to obtain an attenuation coefficient.

U.S. Pat. No. 4,312,050, issued Jan. 19, 1982 to Lucas discloses multidimensional amplitude scaling of seismic data in which each seismic trace associated with a common source-to-receiver distance is first separated into a plurality of frequency band-limited component traces. A time-variant amplitude scale factor is then generated for each component trace. Next, these scale factors are then applied to the component trace thus compensating for amplitude decay of the component trace. Recombination of the component traces creates a multidimensional amplitude scaled seismic trace.

U.S. Pat. No. 4,884,247, issued Nov. 28, 1989 to Hadidi et al., discloses a method of processing geophysical data to compensate for earth filter attenuation.

U.S. Pat. No. 4,964,102, issued Oct. 16, 1990 to Kelly et al., discloses a method for enhancing and evaluating seismic data in which seismic signals are processed to suppress random noise and coherent noise and to enhance primary reflection events while preserving geologically-induced amplitude variations as a function of range for the primary reflection events.

U.S. Pat. No. 5,189,644, issued Feb. 23, 1993 to Wood, discloses the removal of amplitude aliasing effect from seismic data by utilizing a corrective factor, the ratio of amplitude of the seismic data to its trace envelope, prior to transformation from the X-T to the F-K domain. The data is then transformed to the F-K domain where it is subject to filtering. The data is then inverse transformed to the original X-T domain. An inverse corrective factor is then applied, restoring the amplitude of the reflection signal component of the data.

U.S. Pat. No. 5,197,038, issued Mar. 23, 1993 to Chang et al., discloses a seismic processing method which utilizes a sonic tool for quantitatively determining parameters of a velocity profile of an altered zone in a seismic formation traversed by a borehole. In the method, synthetic amplitude information for the formation is generated by a computer model, by providing the computer with a proposed velocity profile for the formation, including values for parameters such as the radius of the altered zone and the acoustic velocities in the altered zone. Next, the synthetic amplitude information is compared with amplitude information of a compressional headwave as measured by the sonic tool located in the borehole.

While prior art methods for compensating for effects of amplitude attenuation accomplish the task to a degree, they suffer from one or more limitations. For example, utilizing scalar corrections will distort temporal and/or spatial amplitude relationships of the seismic data.

Thus, while prior art techniques exist for compensating for effects of amplitude attenuation each of these suffers from one or more limitations and improvement in the techniques is desired.

Therefore, a need exists in the art for an improved method for compensating for effects of amplitude attenuation without the limitations of the prior art.

SUMMARY OF THE INVENTION

It is therefore one object of the present invention to provide an improved method for compensating for effects of amplitude attenuation.

It is therefore another object of the present invention to provide an improved method for compensating for effects of amplitude attenuation by utilizing a fitted decay curve, and to provide an improved method for creating such a fitted decay curve.

It is therefore yet another object of the present invention to provide a method for processing seismic data to compensate for seismic transmission loss caused by the subsurface by utilizing a fitted decay curve, while reasonably maintaining the temporal and spatial relationships of the seismic data, and to provide a method of creating such a gain curve.

These and other objects will become clear to one of skill in the art upon review of this application.

According to one embodiment of the present invention there is provided a method of determining a gain function for seismic data representing subsurface layers of a section of the earth. In this embodiment, the seismic data, in the form of amplitudes versus time is first transformed into logarithms of the RMS values of the amplitudes versus time. Next, the logarithm of the RMS values of the amplitudes of the seismic data is plotted versus time. To this plotted data at least 2 polynomials selected from among 1st to Nth order polynomials are fitted. Preferably, the at least two polynomials are selected from among 2nd to 10th order polynomials, and most preferably, are selected from among 2nd to 5th order polynomials. As a further step of this embodiment, these various polynomials are studied to select the best fit polynomial. The decay function is the natural exponential of the selected polynomial, i.e., $e^{polynomial}$. As a gain function is the inverse of a decay function, the best fit polynomial is inverted to yield the desired gain function, that is, the gain function is equal to $e^{-polynomial}$.

According to another embodiment of the present invention there is provided a method of processing seismic data using a polynomial gain function as determined above.

Further embodiments of the present invention utilize synthetic traces derived from actual well data in selecting the best fit polynomial from among the various polynomial fits. These embodiments either incorporate synthetic data with the seismic data to derive the polynomial functions, and/or utilize the synthetic data as a control to select which polynomial to utilize.

Thus, according to yet another embodiment of the present invention there is provided a method of determining a gain function for seismic data representing subsurface layers of a section of the earth, using a synthetic trace to find best 1st to Nth order polynomial fit. The method of this embodiment generally includes transforming the data in the form of amplitudes versus time into logarithms of the RMS values of the amplitudes versus time. Next, the method includes plotting the logarithms of the RMS values of the amplitudes of the seismic data versus time. To this plotted data at least two polynomials from among 1st to Nth order polynomials are fitted. In this embodiment, the selection of the best fit polynomial is determined by reference to synthetic traces derived from well data.

According to still another embodiment of the present invention there is provided a method of processing seismic data using a gain function selected through use of synthetic well traces.

BRIEF DESCRIPTION OF THE DRAWINGS

FIGS. 1–12 relate to the same 2-D seismic land line.

FIG. 2 shows sonic and density well data for well W1 of the 2-D seismic land line, which represent about 7000 feet of logged subsurface well control data.

FIG. 6 shows SBNs 100 to 600 of FIG. 5A with the near offset vertical seismic profile ("VSP") inserted into the seismic section at SBN 250.

FIG. 7 is a plot of the log of the RMS amplitudes of the 2-D seismic land line data in dB versus two-way travel time.

FIG. 8 shows a series of 1st to 6th order polynomial equations fitted to the 2-D seismic land data of FIG. 7.

FIG. 9 is an RMS error plot of each individual polynomial fit of FIG. 8, as compared to the well synthetic trace data.

FIG. 10 shows for the 2-D seismic land data, the well synthetic trace (plotted as square) to seismic trace (plotted as '+') comparison after application of the method of the present invention to the seismic data.

FIG. 11 shows the cubic polynomial of FIG. 8 plotted on the plot of the log of the RMS amplitudes of the 2-D seismic land line data in dB versus two-way travel time of FIG. 7.

FIG. 12 is a plot of three curves related to the cubic polynomial of FIG. 11, wherein, the "stars" represent the rate of decay or first derivative of the decay curve, the "squares" represent the second derivative or acceleration in the decay, and the "pluses" represent the calculated decay curve.

FIG. 13 shows a 2-D seismic marine line after conventional processing utilizing a prestack automatic gain control ("AGC") function.

FIG. 14 shows a 2-D seismic marine line that has been processed up to the point of applying the gain function of the present invention.

FIG. 15 shows the 2-D marine seismic data processed according to the method of the present invention.

FIG. 16 shows the 2-D marine seismic data processed according to the method of the present invention, with VSP data inserted at SBN 837.

DETAILED DESCRIPTION OF THE INVENTION

Figure 1A:
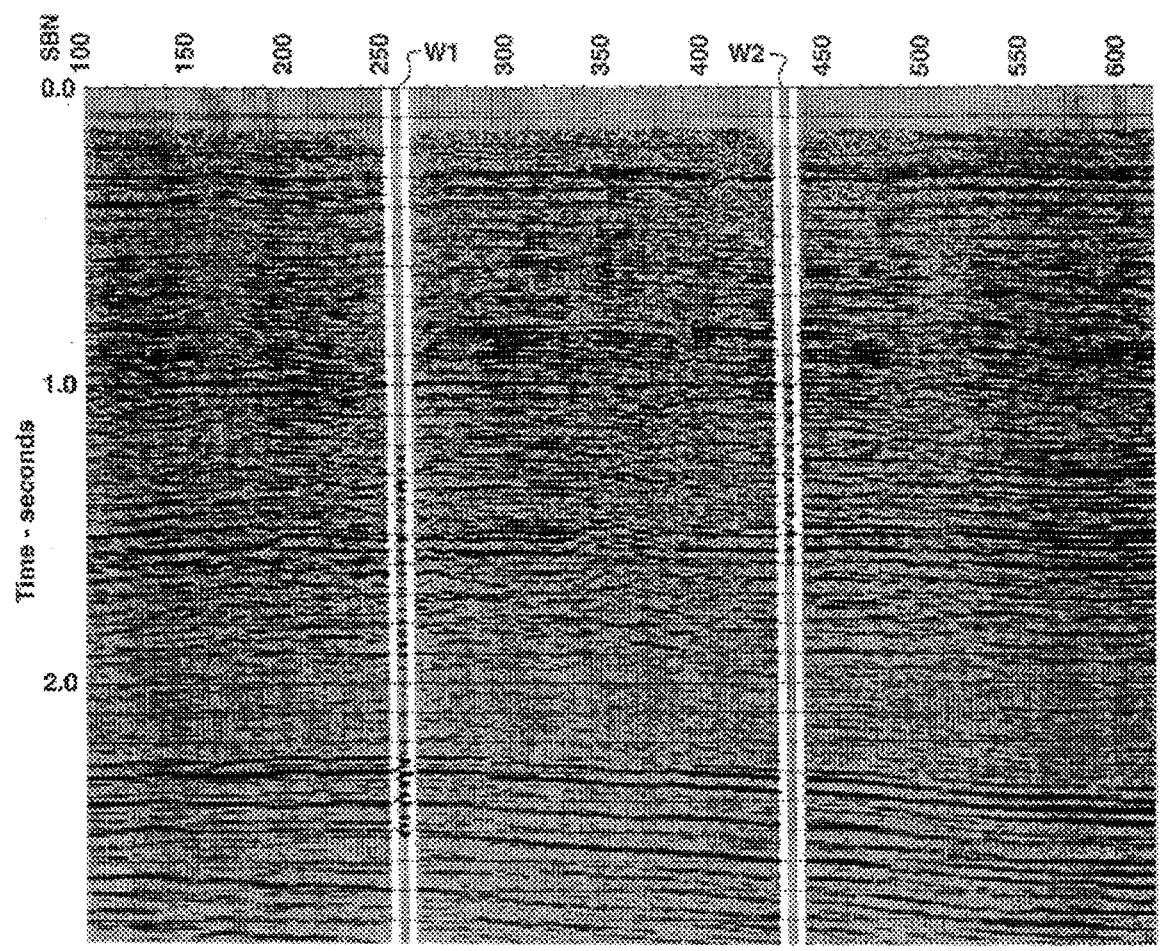
FIGS. 1A and 1B show a 2-D seismic land line after conventional processing utilizing a prestack automatic gain control ("AGC") function.

In the practice of the method of the present invention, seismic data may acquired by any suitable method, such as any of the numerous well known seismic exploration techniques.

Generally, an acoustic wave source, such as dynamite or vibrator on land, or air gun at sea, provide acoustic waves which travel downwardly into the earth and are reflected upward from subsurface reflecting interfaces. These reflected waves are received at detectors, such as seismometers, geophones or hydrophones, which produce analog electrical seismic signals or seismic trace signals, which are recorded as reflection amplitude versus arrival time.

The present invention provides a method to measure and correct energy decay left in the seismic data after the application of divergence correction, and is preferably carried out utilizing a computer, microprocessor or other such device.

The method of generating a gain function and the method of processing seismic data of the present invention both generally include transforming the seismic data from amplitudes as a function of arrival time into logarithm of the RMS amplitudes as a function of arrival time to form an energy decay plot.

Transforming the seismic data is simply accomplished by transforming the amplitude values into root mean square or RMS values, where the root mean square is the well known mathematical definition of the square root of the average of the squares of the amplitudes. Next, the RMS amplitude values are transformed into logarithic values at each arrival time. This transformed data is a representation of the decay curve of the seismic data.

In those instances where certain of the data points appear in the judgement of one of skill in the seismic interpretation art to be statistically outside the range of the bulk of the data points, these outliers may be ignored in the formation of the various polynomial equations.

The seimic processing method and the method of generating a gain function of the present invention also both generally include generating for the transformed data, at least two polynomial equations, preferably a series of polynomial equations, in time to approximate the decay curve. These polynomial equations will represent the logarithm of the RMS seismic amplitudes as a function of the two-way travel time.

The polynomial equations as a function of time, i.e. poly(t), will generally be of the form:

$$\text{Log RMS Amp}(t) = K_0 + K_1 t + K_2 t^2 + \ldots + K_N t^N \quad \text{(EQN 1)}$$

wherein the logarithms of the RMS values are expressed as function of time ("Log RMSAmp(t)"), the K's are various constants and t is the two-way travel time, and N is the order of the polynomial. In the practice of the present invention, it is necessary to solve for the various constant K's, using well known methods such as least squares fit.

Generally in the practice of the seismic processing method and the method of generating a gain function of the present invention, at least two equations of the form of EQN 1 are fitted to the seismic data, wherein for EQN 1, N may be any suitable number, generally limited by the realities of economics. Current economics favor utilizing Ns in the range of about 1 to about 15, preferably in the range of about 2 to about 10 and most preferably in the range of about 3 to about 5.

Preferably, in the practice of the present invention, at least one of the polynomial functions fitted to the data must be a 2nd or higher order polynomial.

At a minimum, the coefficients of the generated polynomials must contribute significantly to the design of the gain curve. Past a certain N, which will differ according to the actual data utilized, the additional coefficients will not contribute significantly to the design of the gain curve.

Methods of generating polynomial equations for data are well known to those of skill in the art. Any suitable method for generating polynomial equations for the transformed data may be utilized, include those disclosed by P. R. Bevington in "Data Reduction and Error Analysis for the Physical Sciences", 1969, McGraw-Hill, herein incorporated by reference. Preferably, a least squares fit method will be used to generate the polynomial equations.

The method of the present invention also generally includes determining which of the various polynomials are the best fit to the decay curve of the data. Such methods of determining how well a polynomial fits certain data are well known to those of skill in the art, and any suitable method may be utilized in the present invention.

One common method of determining which polynomial function is the best fit, is to represent the data graphically and overlay the various polynomial functions on the data and select the function that best correlates with the data.

Numerical techniques which calculate the error between the data and the various polynomial functions also can be utilized.

Preferably, the method utilized to determine the error between the data and the various polynomial functions is the least squares method, in which the constants K for EQN 1 above are selected to provide the smallest RMS error between the data points and the polynomial function. These RMS errors for the various polynomial functions can then be compared to determine which polynomial function is the best fit.

In the least squares method, for an Nth order polynomial, N+1 normal equations are written to be solved. To solve for the constants K, a solution is found for the equation A=MX, in which A represents the amplitudes, M is the matrix of normal equations, and X represents vectors of the polynomial equations. The above equation A=MX is rewritten as $X=M^{-1}A$ and a solution is found for X, the vectors of the polynomial equations.

Techniques for inverting a matrix are well known and any suitable method may be utilized. Preferably, a singular value decomposition method is utilized, in which the polynomial matrix is broken down into three submatrices and solved.

In addition, the polynomial functions which are selected to represent the decay curve must have a shape that makes geologic sense. According to the present invention, the polynomial selected to represent the decay curve must decrease in time and become asymptotic with the time axis. While not wanting to be limited by theory, the inventors believe that this is required of the decay curve based on the theories that: (1) the earth never adds energy to seismic data; and (2) transmission losses tend to vanish at large depths due to compaction.

To determine whether the polynomial function selected to represent the decay curve has a shape that makes geologic sense, and to determine where it becomes asymptotic with the time axis, various derivatives of the polynomial proposed as the decay function are examined. The first derivative with respect to time of the selected polynomial function will represent the rate of decay of the decay curve. The second derivative with respect to time of the selected polynomial function will represent the acceleration in the decay, and the point at which it crosses the zero line will represent the point at which the decay curve becomes asymptotic with the time axis.

Finally, where a synthetic trace from actual well data exists, it may be used in the method of the present invention. First, the polynomial function that provides a gain curve that best correlates the seismic data to the well data, is the one that is to be selected from among the polynomial functions that make geologic sense. Second, the synthetic data can be incorporated into the seismic data to be used in the generation of the various polynomial functions. The synthetic data may be given any desirable weighting when incorporated into the seismic data.

The decay function as a function of time, i.e. decay(t), is equal to the natural exponential of the selected polynomial function, poly(t):

$$\text{decay}(t) = e^{\text{poly}(t)} \qquad \text{EQN 2}$$

As a gain function is the inverse of a decay function, the best fit polynomial is inverted to yield the desired gain function. This is easily accomplished by taking the natural exponential of −poly(t):

$$\text{gain}(t) = e^{-\text{poly}(t)} \qquad \text{EQN 3}$$

If a laterally varying gain is desired for the particular seismic data, the method of the present invention can be utilized at two or more locations and polynomial coefficients for the gain function prorated linearly or areally in any geologically reasonable manner.

The gain function of the present invention may be utilized with other suitable seismic processing techniques known to those of skill in the art.

When utilized with other processing techniques, it is preferred that: spherical divergence be applied; the data is processed to remove multiples, filtered and migrated to its proper spatial position; the final stacked section approximates zero offset; and that both the phase and the amplitude of the wavelet be known.

The gain function of the present invention may be applied during any phase of the seismic processing stream. Preferably, it is applied as one of the last few, if not the last processing step, so that if iterations are to be made, fewer processing steps need be repeated.

When a well data synthetic trace is utilized, it is preferred that: the synthetic trace follow the convolution model; reasonable conditions existed during logging of the well data; sonic and density logs be properly corrected to produce reasonable reflection coefficients; the frequency of the pulse convolved with the reflection coefficient series matches the peak seismic frequency within the interval of comparison; and that the integrated well data was calibrated with reliable checkshots.

Preferably, the method of the present invention is implemented utilizing a computer, microprocessor or other such processing device having suitable software for carrying out the above described means.

EXAMPLE

Example 1—Land Seismic Line

Figure 1B:
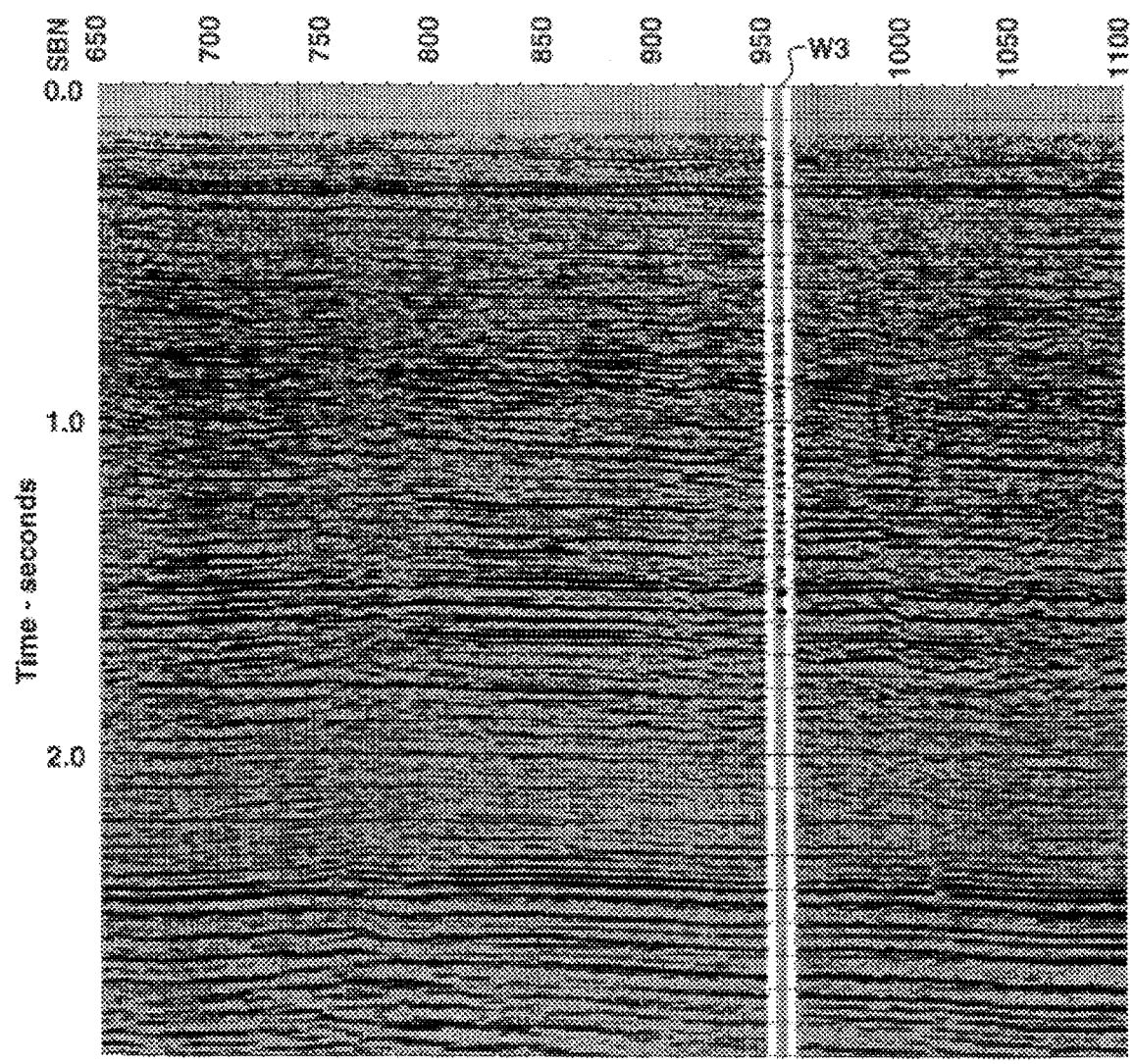
Figure 3A:
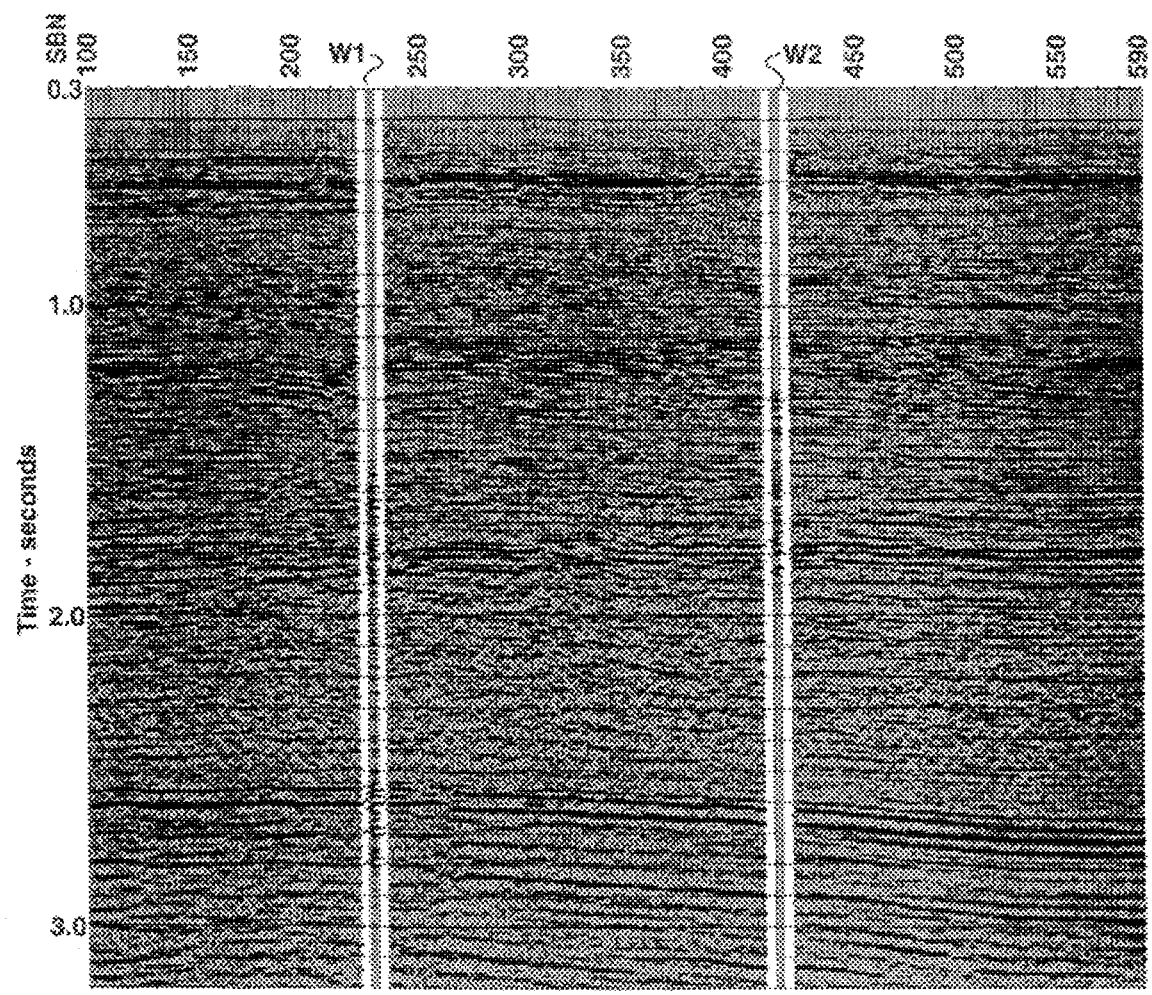
FIGS. 3A and 3B show the 2-D seismic land line data after processing by a commercial seismic data processing which included preprocessing, trace editing, migration, CDP gathering, NMO, velocity analysis, equalization, stacking, zero phasing, a time variant filter, and post-stack uphole corrections.
Figure 3B:
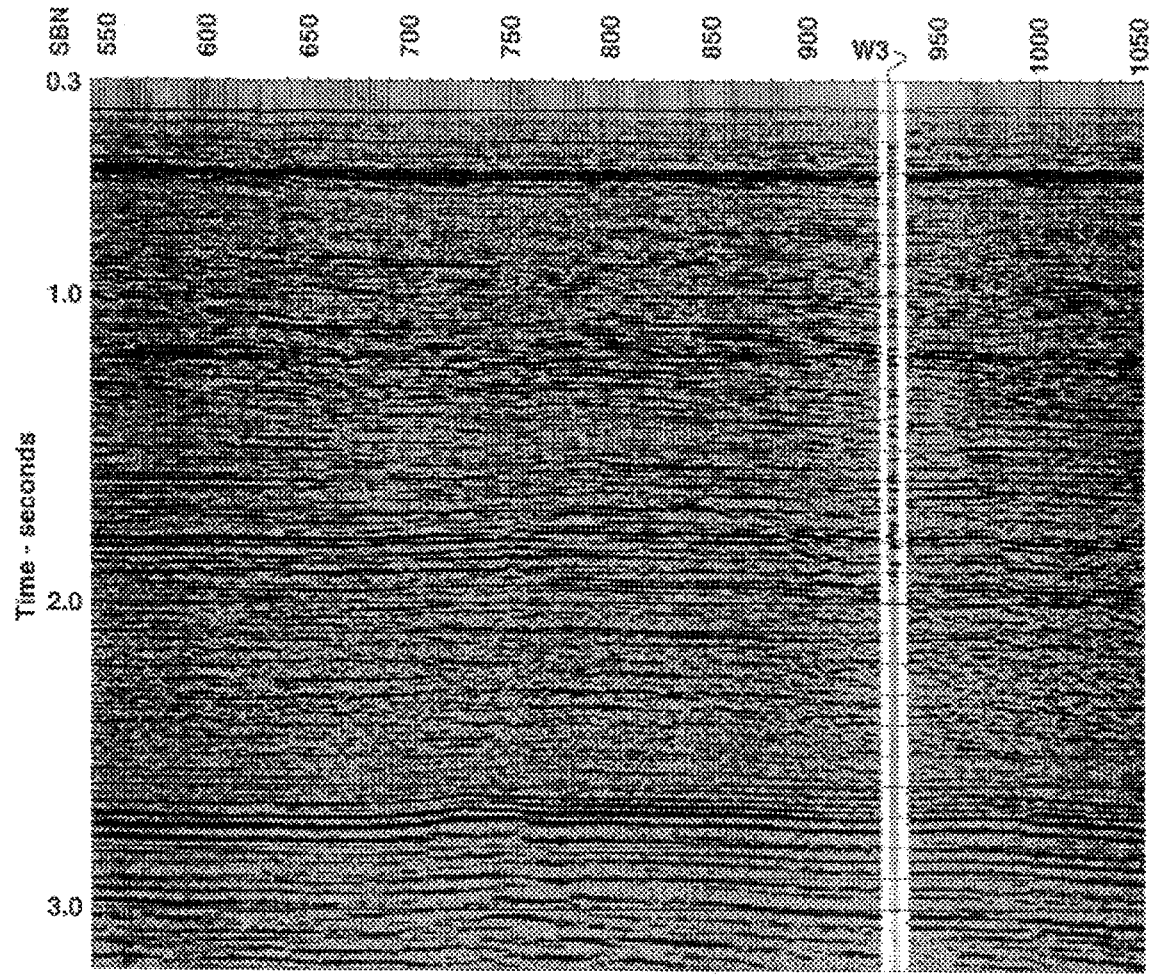
Figure 4A:
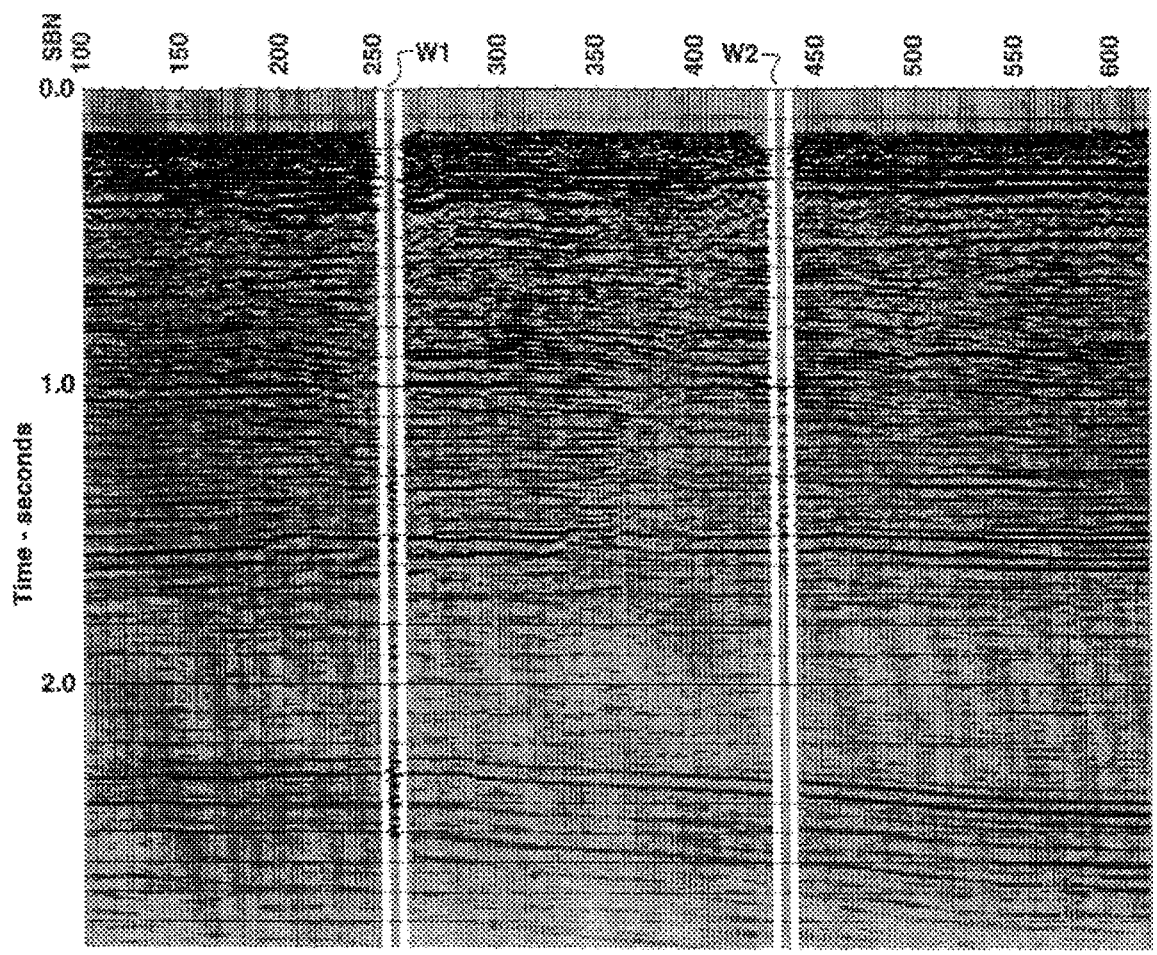
FIGS. 4A and 4B show the 2-D seismic land line data that has not been subjected to the traditional gain functions nor the gain function of the present invention, but has already been subjected to a divergence correction, an F-k filter, surface consistent and short amplitude corrections, a prestack deconvolution, velocity and statics corrections, attenuation correction, amplitude preserving DMO, stacking, a post-stack deconvolution and time migration.
Figure 4B:
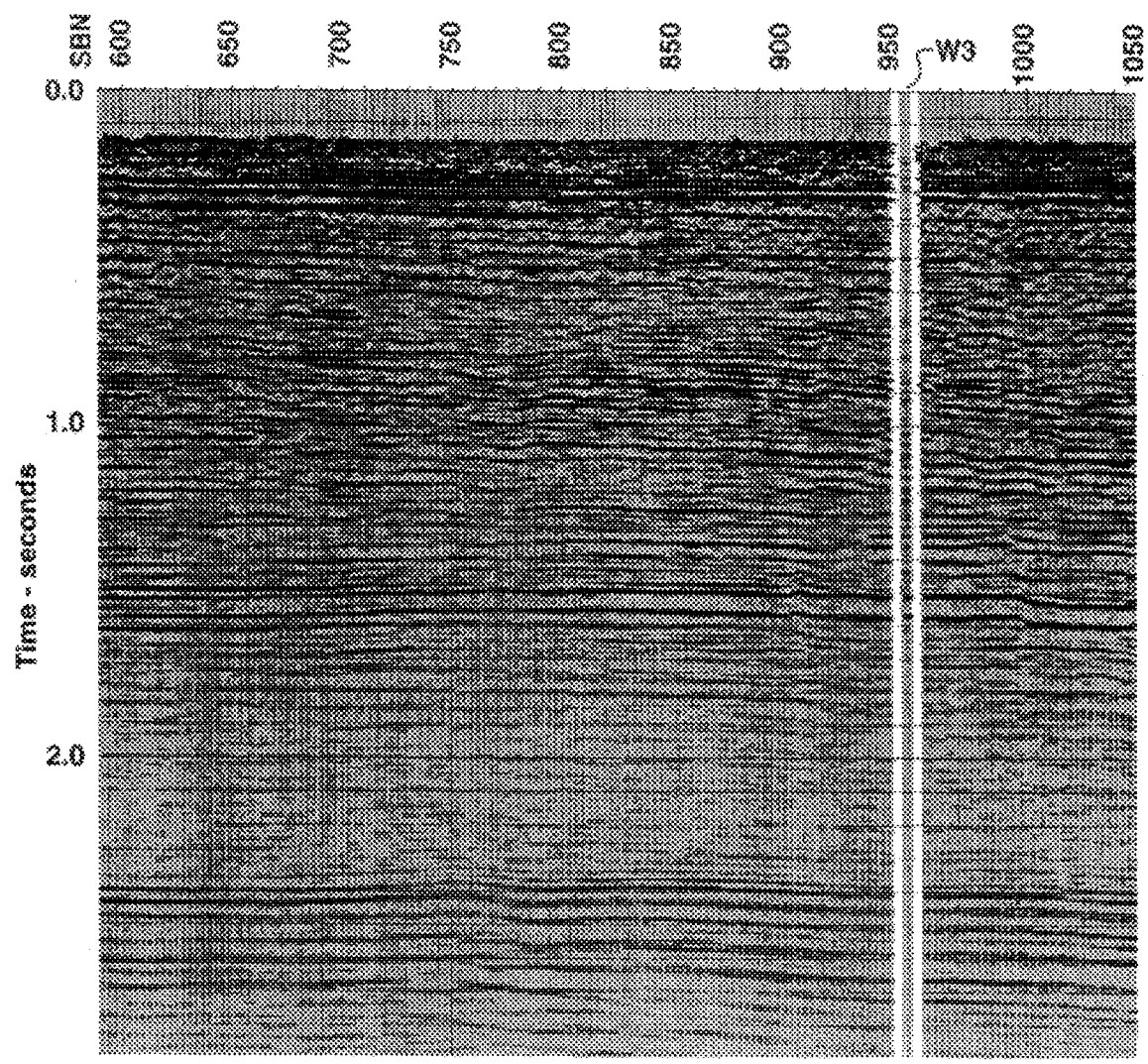
Figure 5A:
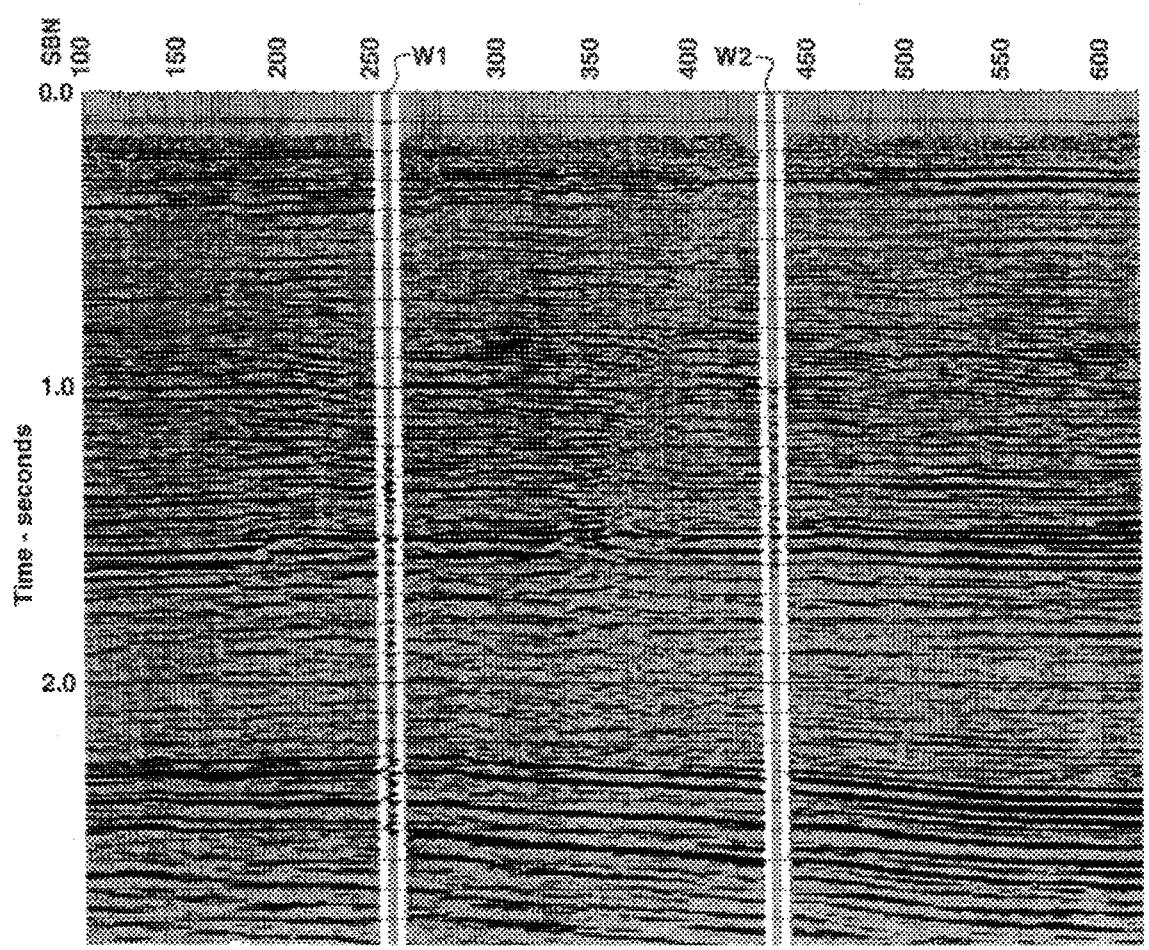
FIGS. 5A and 5B show the 2-D seismic land line data processed according to the method of the present invention.
Figure 5B:
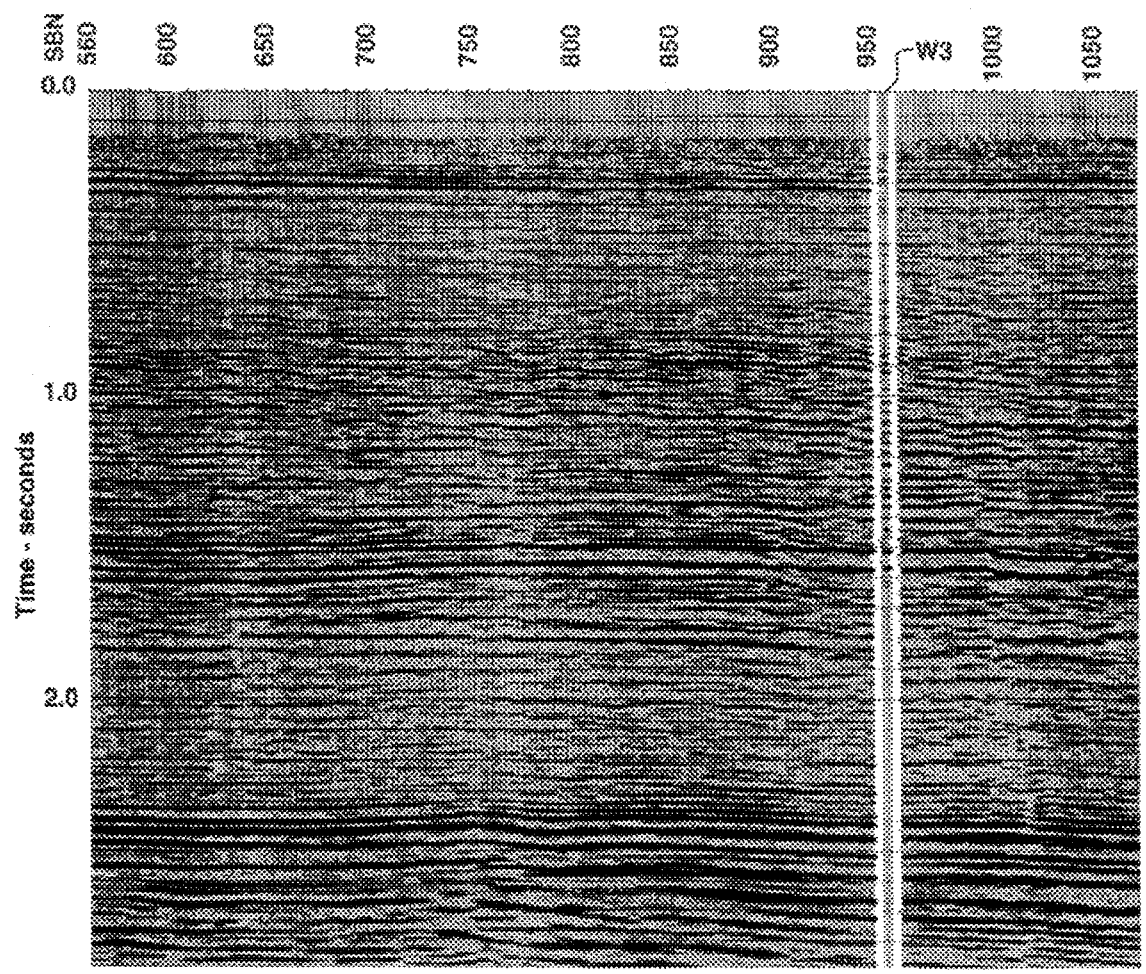

In this example, a 2-D seismic land line is processed conventionally and according to the method of the present invention. Comparisons are then made to synthetic traces from three wells on the seismic line and to vertical seismic profiling ("VSP") data. In this example, comparisons will also be made between:

(1) conventional seismic processing with automatic gain control (FIGS. 1A and 1B);

(2) conventional seismic processing by a commercial contractor (FIGS. 3A and 3B);

(3) processing without automatic gain control and without the gain method of the present invention (FIGS. 4A and 4B); and (4) processing with the gain method of the present invention (FIGS. 5A and 5B).

The seismic line utilized in this example is a 2-D seismic land line having stacking bin numbers ("SBN") 100 to 1075. Since the line is so long, it is divided into SBN Nos. 100 to 620 on the "A" figures and SBN Nos. 560 to 1075 on the "B" figures. The data was acquired utilizing controlled phase acquisition and shaped sweep vibrators.

Shaped sweeps are sweeps designed so that the correlated data will have a single wavelet shape and minimal side lobe energy. This is accomplished by shaping the sweep so as to yield a specific power spectrum, as more fully described in copending U.S. patent application Ser. No. 08/086,776, filed Jul. 1, 1993 and assigned to the assignee of the present invention, which is hereby incorporated by reference.

(1) Conventional Seismic Processing With Automatic Gain Control (FIGS. 1A and 1B)

FIGS. 1A and 1B show the 2-D seismic land line after conventional processing utilizing a prestack automatic gain control ("AGC") function. The synthetic traces for well W1 located at SBN 250 show larger amplitudes than the seismic traces below about 2.2 seconds. Well synthetic trace to seismic trace ties at about 1.5 second are rated fair to poor.

This seismic line was subjected to conventional processing well known to those of skill in the seismic processing art, which included phase control and refraction statics, an exponential gain function with a 400 ms window, an F-k filter that was applied to the Normal Moveout (NMO) corrected shot gathers, pre-stack deconvolution, velocity analysis, statics, dip moveout (DMO), a post-stack deconvolution, and migration.

On the seismic line, note the presence of wells W1, W2 and W3 at SBNs 250, 437 and 950 respectively, which are all vertical and fall directly on the seismic line.

Figure 2:
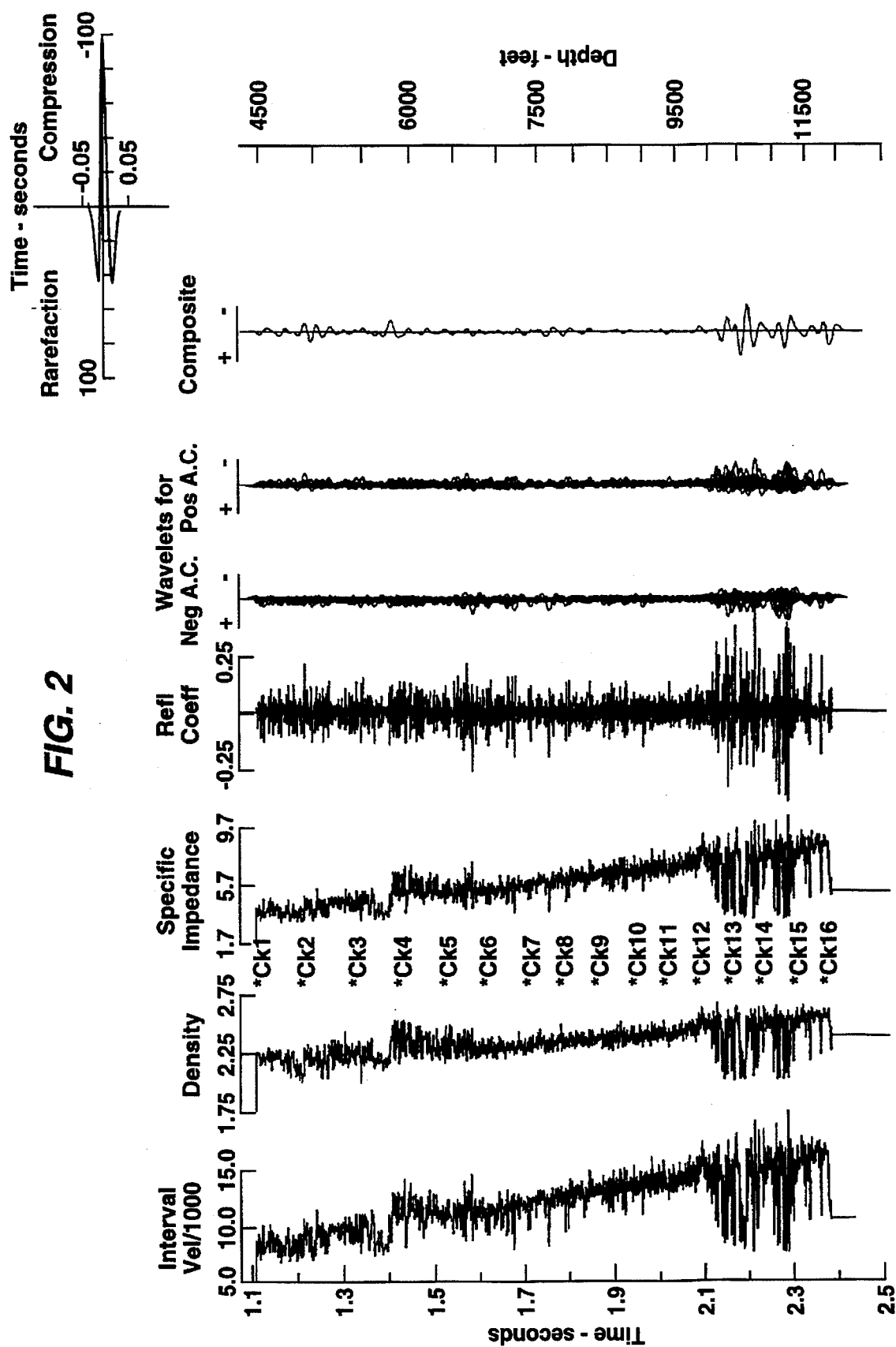

FIG. 2 shows sonic and density well data for W1 which represent about 7000 feet of logged subsurface well control data. The interval velocities and the densities shown in FIG. 2 were obtained utilizing a well tool. Next, the specific impedance series shown in FIG. 2 was derived from the velocity data. The reflection coefficient series shown in FIG. 2 was derived from the specific impedance series shown in FIG. 2. Finally, the wavelets shown in FIG. 2 were obtained by convolving a pulse with the reflection coefficient series shown in FIG. 2. The resulting composite well synthetic time response shown in FIG. 2 was obtained by convolving a pulse at the peak frequency of the seismic data with the calculated reflection coefficients series of FIG. 2.

Well synthetics were calculated for each processed section, with a pulse designed to match the seismic bandwidth. This particular well synthetic of FIG. 2 is imbedded on FIG. 4A at SBN 250 for W1. Well synthetics for wells W2 and W3 were obtained in a similar fashion and are shown embedded at SBN 437 on FIG. 4A for well W2 and at SBN 950 on FIG. 4B for well W3. These well synthetics are used to examine the processed seismic data. If the seismic amplitudes match the well synthetics in a temporal sense, the interpreter can have a greater confidence in the well-to-seismic tie. Lateral variations in the seismic amplitude can then be interpreted as changes in geologic depositional patterns.

(2) Seismic Processing by a Commercial Contractor (FIGS. 3A and 3B)

FIGS. 3A and 3B show the 2-D seismic land line after processing by a commercial seismic data processing contractor which included preprocessing, trace editing, migration, common depth point (CDP) gathering, NMO, velocity analysis, equalization, stacking, zero phasing, a time variant filter, and post-stack uphole corrections.

The peak frequency of this processed data was calculated at 39 Hz, with the signal/noise level calculated to be 4:1.

(3) Processing Without Automatic Gain Control and Without the Gain Method of the Present Invention (FIGS. 4A and 4B)

As displayed in FIGS. 4A and 4B, the data has not been subjected to the traditional gain functions nor the gain function of the present invention, but has already been subjected to a divergence correction, an F-k filter, surface consistent and short amplitude corrections, a pre-stack deconvolution, velocity and statics corrections, attenuation correction, amplitude preserving DMO, stacking, a post-stack deconvolution and time migration.

The magnitudes of the seismic amplitudes are much greater in the shallower portion of the section and rapidly decrease in magnitude as time increases. Notice that while the well synthetic traces and the seismic traces have a reasonable character tie, they mistie in amplitude response. Specifically, the well amplitudes of the deepest well, SBN 250, are visibly greater than the amplitudes of the actual seismic data below 2.3 seconds and the well amplitudes, SBN 950, much weaker then the seismic above 1.0 second.

(4) Processing With the Gain Method of the Present Invention (FIGS. 5A and 5B)

FIGS. 5A and 5B show the seismic data, processed as described in Example 1(3) above that is further subjected to the gain function of the present invention. The seismic amplitudes have been properly adjusted to tie to the well amplitudes at all seismic times with the exception of the first 0.3 seconds of well W3 at SBN 950. The inventors theorize that either the shallow portion of the stacked seismic section represents a non-zero offset, or the first hundred feet of the well was not properly logged because of bad hole conditions or too little velocity difference between the mud and formation.

Figure 6:
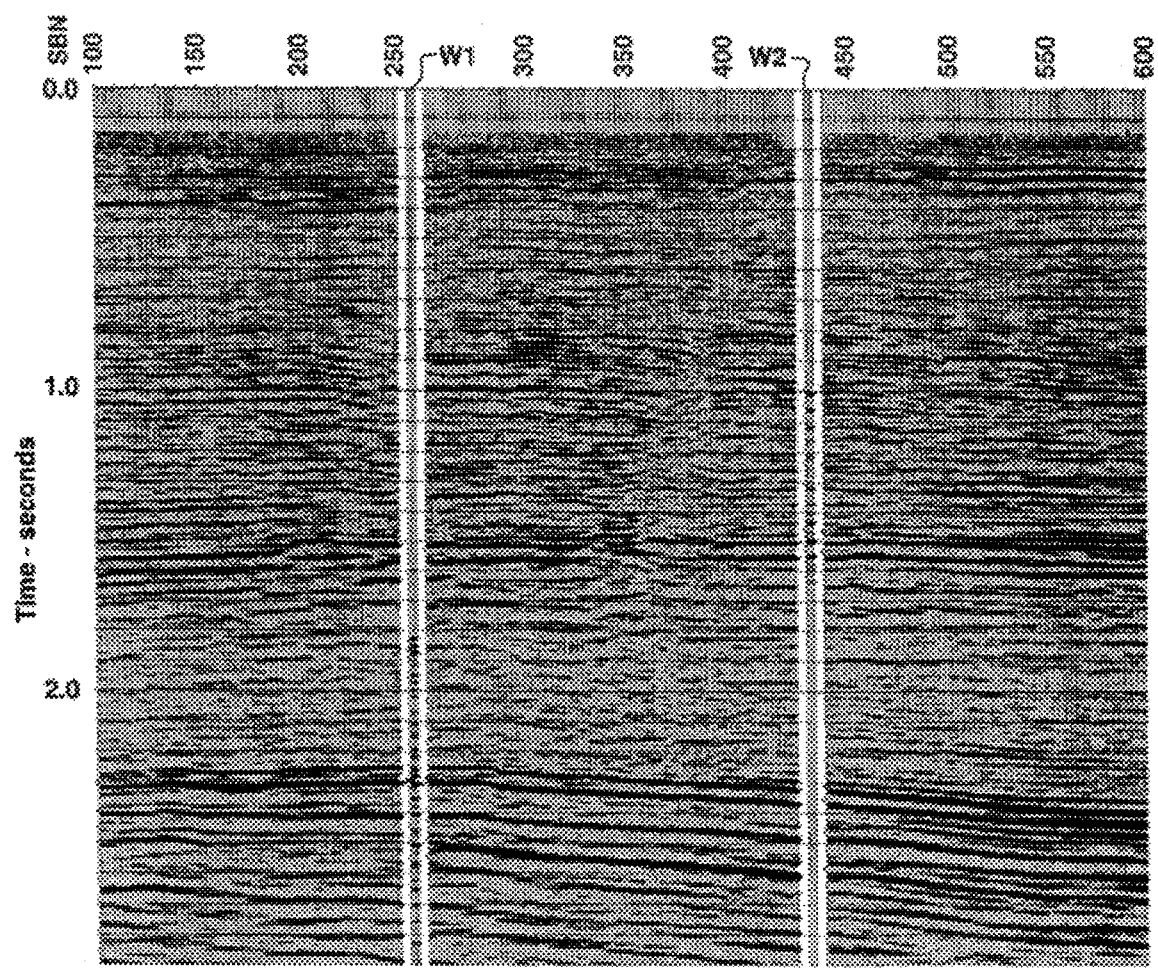

FIG. 6 shows SBNs 100 to 600 of FIG. 5A with near offset vertical seismic profile ("VSP") data inserted into the seismic section at SBN 250 as a control. This VSP data was taken at well W1 using a time window of 1.8 to 2.4 seconds. Analysis indicates that the VSP trace to seismic trace correlation (or "tie") of FIG. 6 is much better than the synthetic well trace to seismic trace tie of FIG. 5A. This deterioration in well-to-seismic tie is probably caused by bad hole conditions that effected well logging more than it effected VSP recording. VSP and seismic energy are similar in frequency and wave length response, not as susceptible to short period, high frequency disturbances that would be recorded on a sonic log.

Determination of Gain Function

The gain function used in this Example 1(4) was determined as follows.

Figure 7:
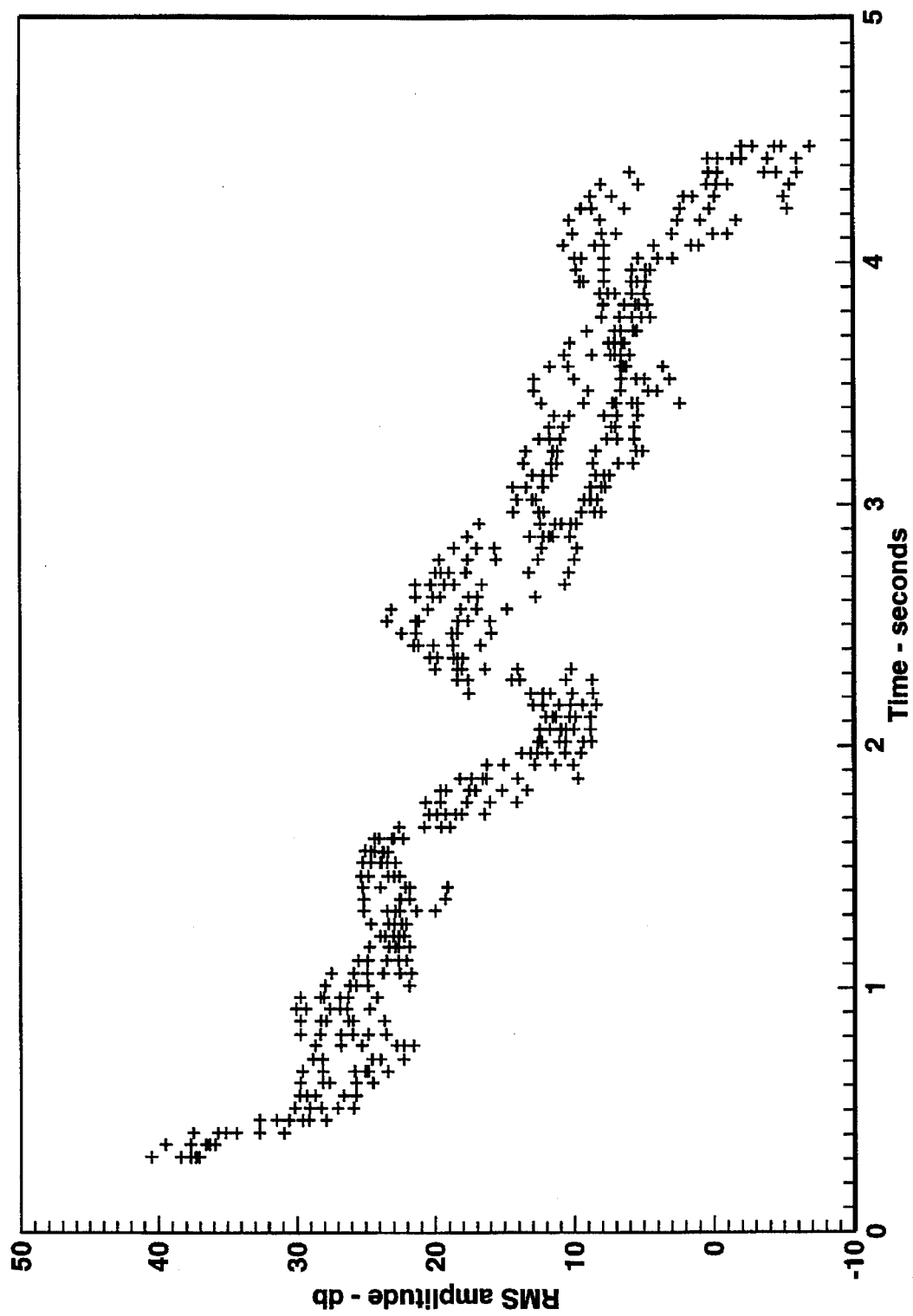

FIG. 7 is a plot of the RMS values of the log of the seismic data amplitudes in dB versus two-way travel time. This plot shows that there is an average 34 dB loss of energy over 4.0 seconds. Several locations along the seismic line have been measured from a common datum. The RMS values are measured over a 200 ms. sliding window.

Figure 8:
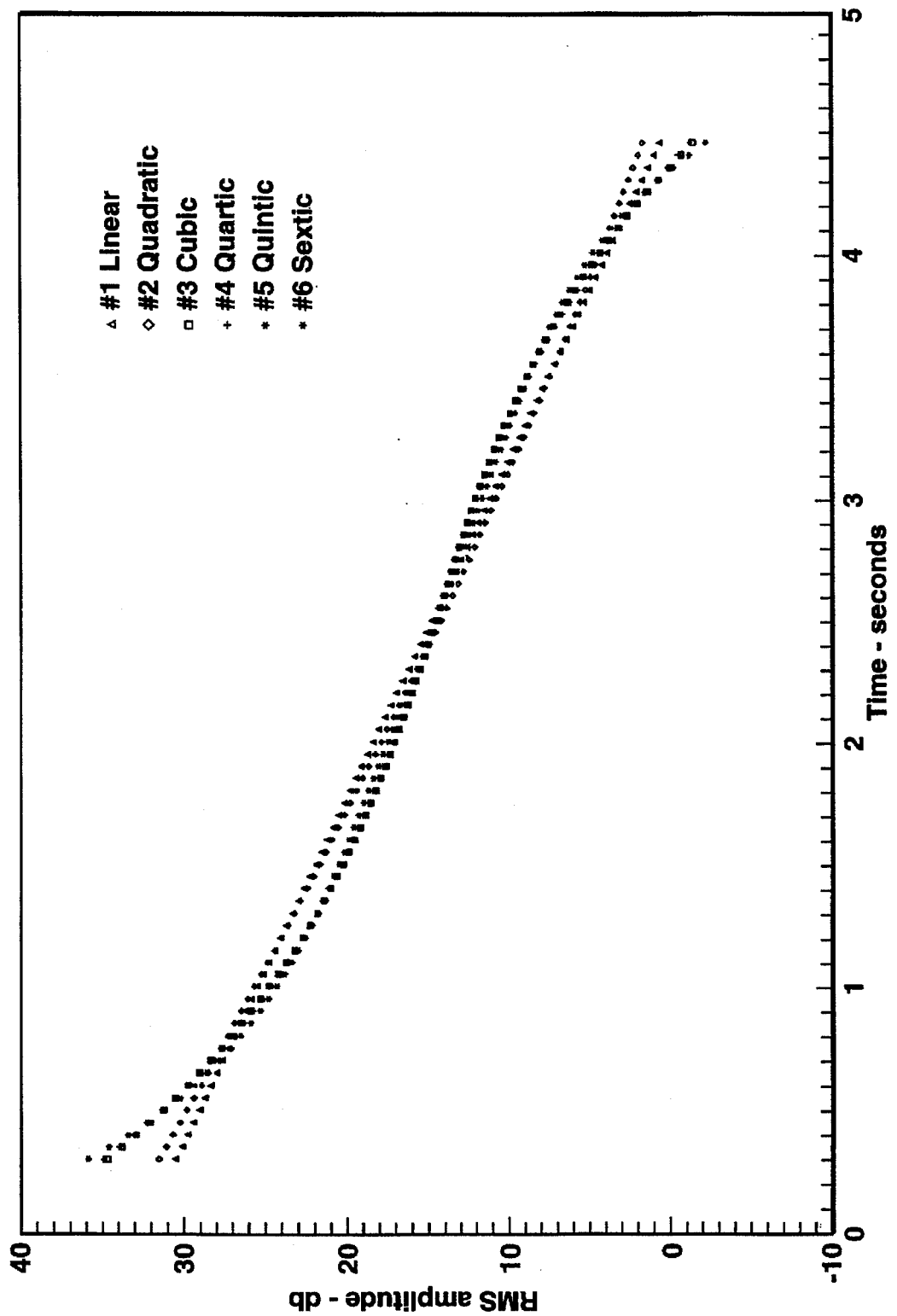

A series of polynomial equations, i.e. poly(t), of the form $$\text{Log } Amp(t) = K_0 + K_1 t + K_2 t^2 + \ldots + K_N t^N$$

wherein K's are various constants and t is the two-way travel time in seconds, and N is the order of the polynomial, are used to fit the data, varying from 1st to sixth order, and are shown plotted in FIG. 8. The lower order curves, linear, quadratic and cubic look the most stable.

Figure 9:
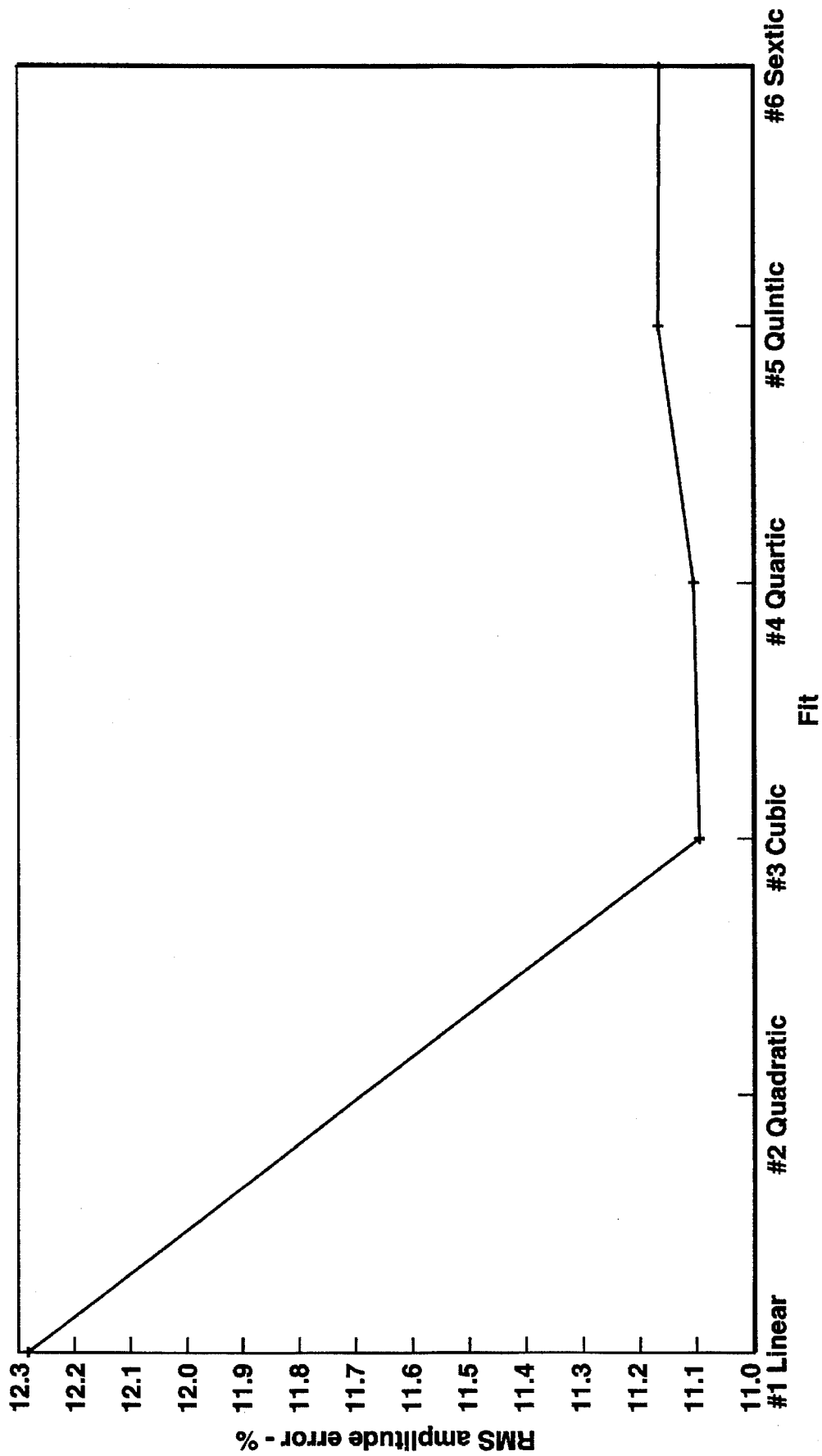

FIG. 9 is an RMS error plot of each individual polynomial fit compared to the well data. The errors were calculated by first determining the error between the polynomials and the actual data for each data point and then determining the RMS errors for each polynomial. This plot suggests that the cubic solution (RMS error 11.1%) is better than the linear solution (RMS error 12.3%) or the quadratic solution (RMS error 11.7%).

The cubic equation as a polynomial function of time, poly(t), was as follows:

$$poly(t) = -17.828 - 27.661t + 8.318t^2 - 1.049t^3$$

As explained above, the decay function, decay(t) is equal to $e^{poly(t)}$ or $$(-17.828 - 27.661t + 8.318t^2 - 1.049t^3) e$$

The gain function, gain(t), is equal to the inverse of the decay function or equal to $e^{-poly(t)}$ or $$-(-17.828-27.661t+8.318t2-1.049t^3)\,e$$

Figure 10:
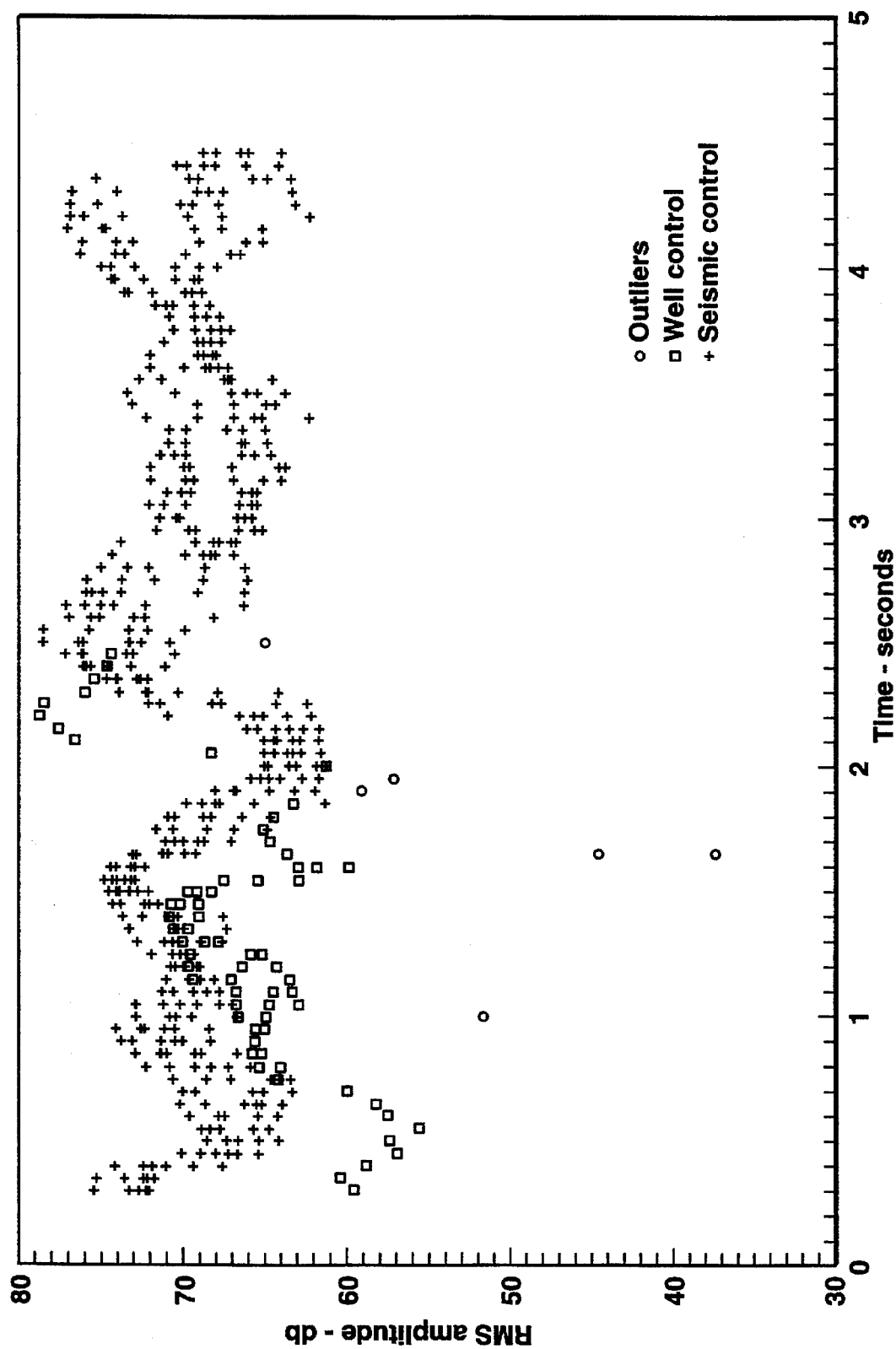

FIG. 10 shows the well synthetic trace (plotted as square) to seismic trace (plotted as '+') comparison after application of the method of the present invention to the seismic data. Six of the synthetic well outliers which have been circled, were determined by one of skill in the art to be outside of the acceptable data range, and therefore have been ignored in the evaluation of the data sets. This figure shows the seismic traces to have greater amplitude than the synthetic traces over the first 0.8 seconds of data. This is probably due to the fact that the acquisition was designed for deep targets. Below 2.0 seconds of data, the well synthetic traces have higher amplitudes than the seismic traces. This is probably due to using a synthetic trace program which over estimates amplitudes for thin beds with large reflection coefficients due to the fact that the program utilized does not calculate interbed multiple effects.

Figure 11:
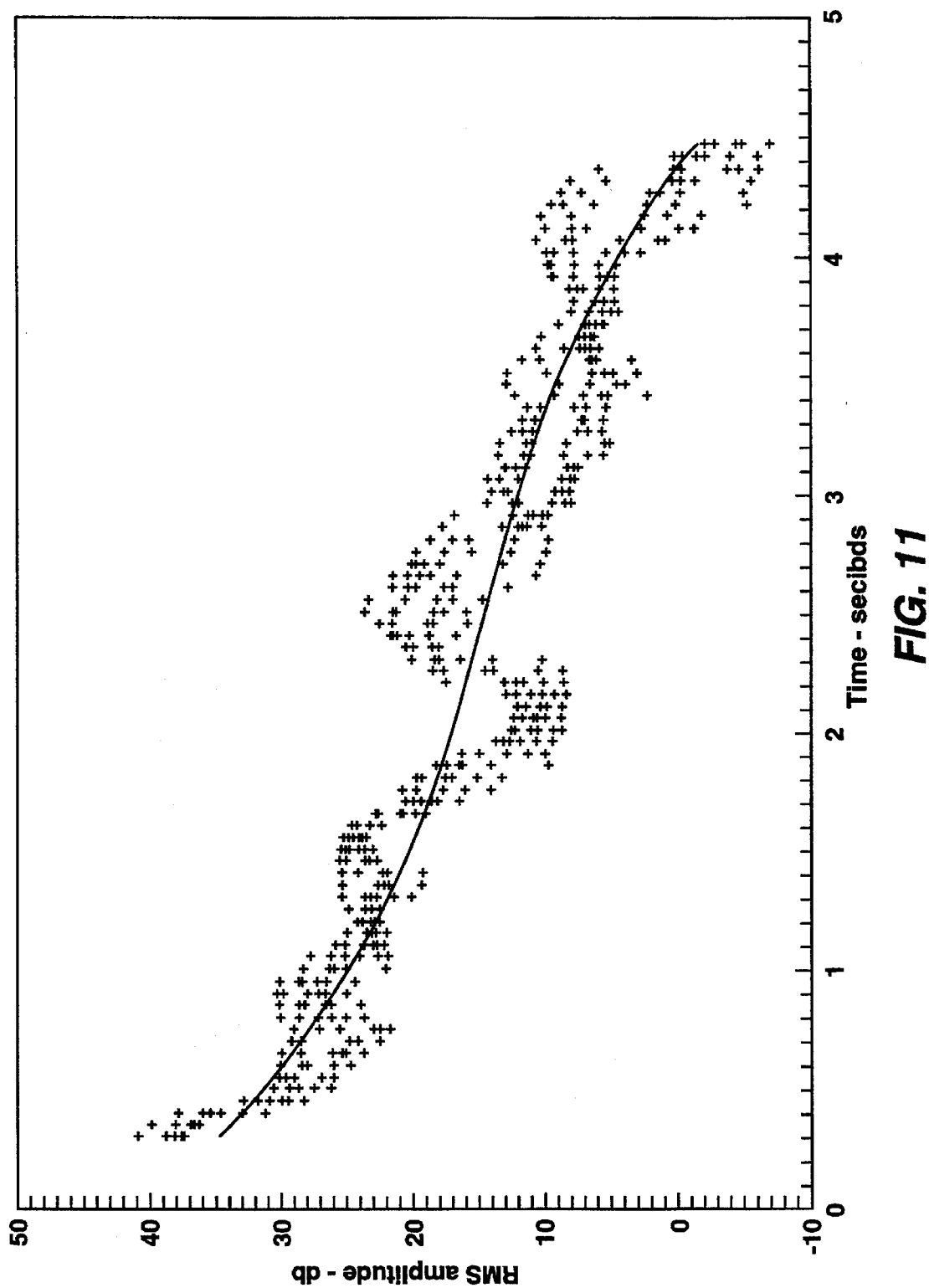

FIG. 11 shows the cubic polynomial of FIG. 8 (that is the one that demonstrated the best fit above) plotted on the data of FIG. 7, i.e., the RMS values of the log of the seismic data amplitudes in dB versus two-way travel time. In general, there is good agreement of fit over the entire length of the data. At about 2.5 seconds, there is a slope change in the curve that would correspond to an increased rate of decay. Notice that this third order polynomial curve represents a low frequency trend in the seismic data, meaning that short period geologic changes remain in the data after application of the gain function of the present invention.

Figure 12:
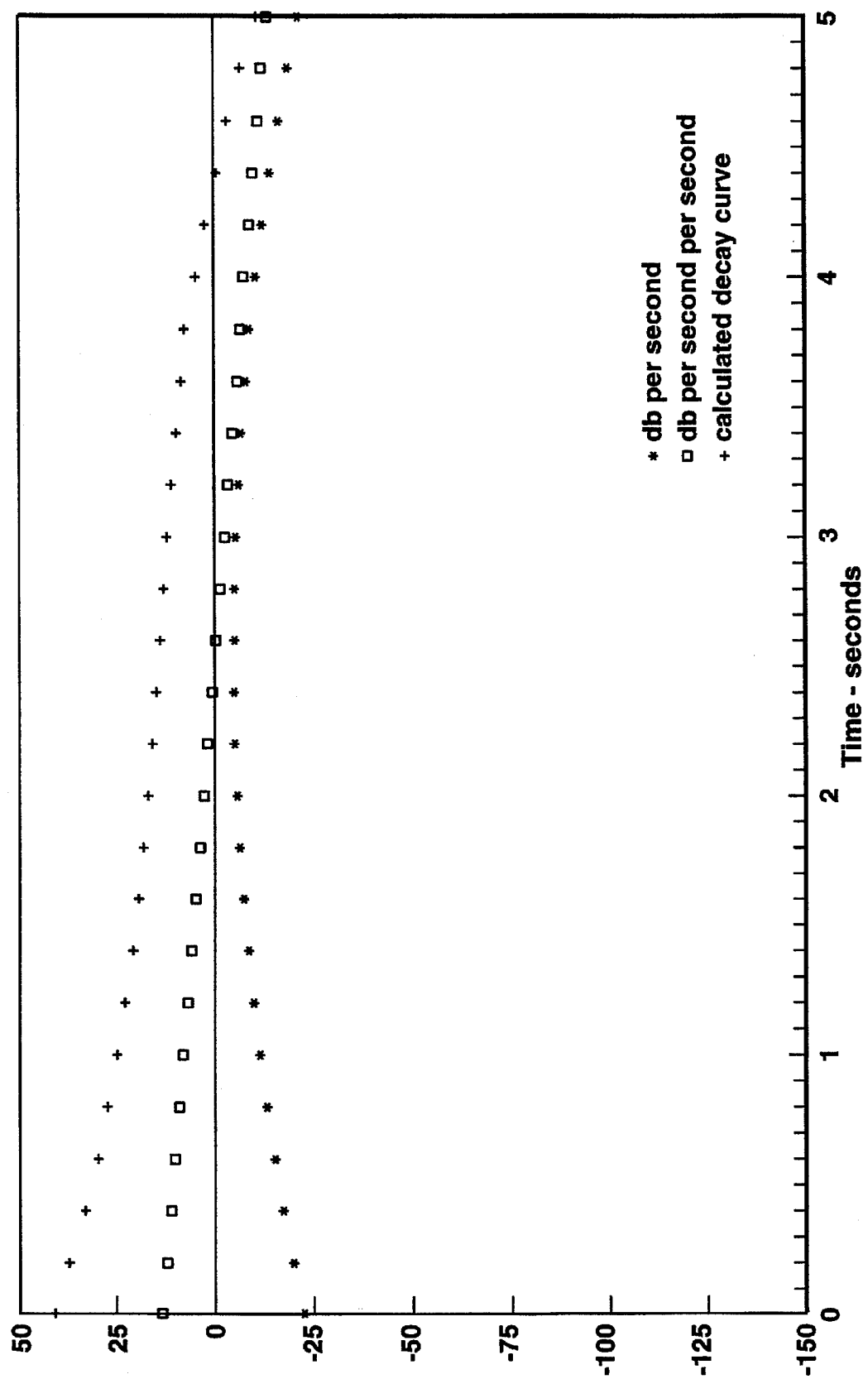

FIG. 12 is a plot of three curves, wherein, the "stars" represent the rate of decay or first derivative of the decay curve, the "squares" represent the second derivative or acceleration in the decay, and "+" represent the calculated decay curve. The second derivative curve crosses the zero line at about 2.5 seconds. This crossover point represents the place where the decay rate of decay starts to change from a positive (decreasing) rate to a negative (increasing) rate of decay. In the processing of the seismic line, this crossover point was chosen as the saturation line, at which from this time (2.5 seconds) to the end of data, the applied gain is a constant number.

Comparison of Different Methods

TABLE 1 is a comparison of the results of Example 1 (1)–(4), as described above. In the table, the processing results are correlated to the synthetics at wells W1, W2 and W3, and to the VSP data, with results measured in percentage of correlation.

TABLE 1

Correlation Values In Percentage
At Various SBNs Along The Seismic Land Line
For Various Processing Methods

| Processing Method Example No. | Comparison Location By SBN | | | |
|---|---|---|---|---|
| | W1 250 | VSP 250 | W2 437 | W3 950 |
| (1) Conventional | 46 | 74 | 58 | 37 |
| (2) Contractor | 21 | 36 | 37 | 18 |
| (3) w/o gain | 39 | 72 | 66 | 25 |
| (4) Invention | 57 | 74 | 70 | 51 |

As shown in Table 1, processing the 2-D seismic land line data with the method of the present invention yields a better correlation to well synthetic data than processing the data with commercial methods, without gain, or by conventional methods. In correlations to VSP data, the processing method of this invention yielded results equal to that of conventional processing.

Example 2—Marine Seismic Line

Figure 13:
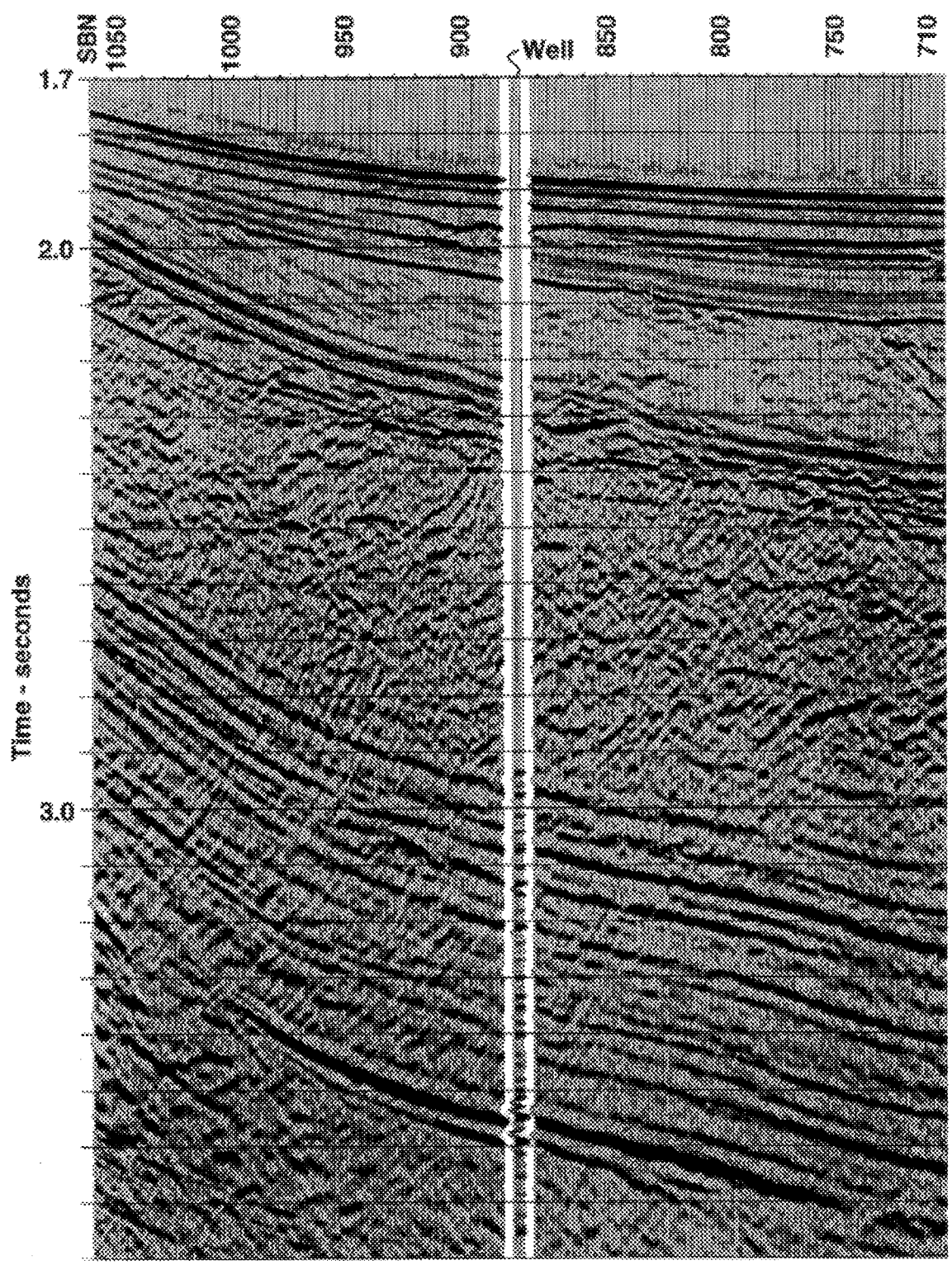
FIGS. 13–16 relate to the same 2-D seismic marine line.
Figure 14:
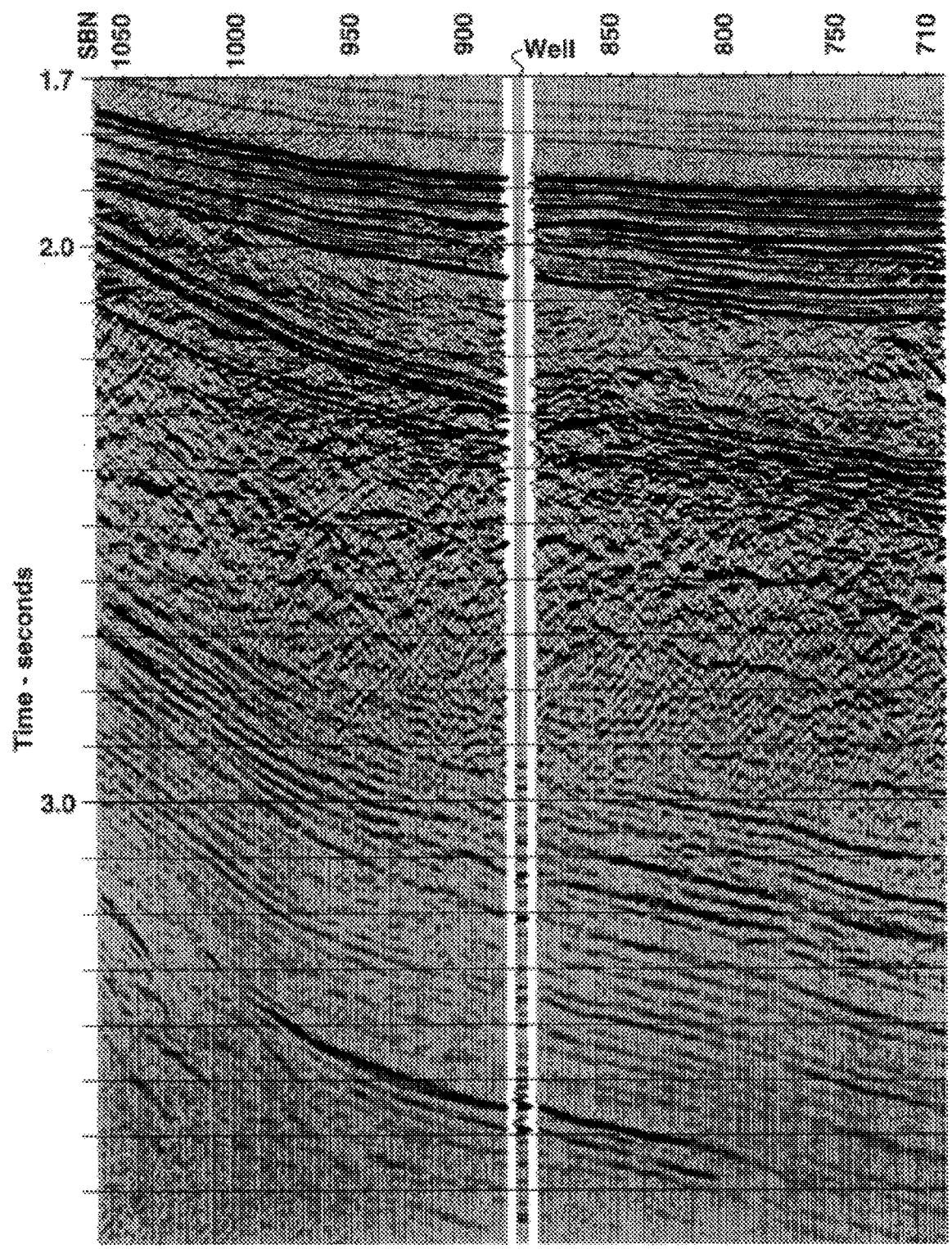
Figure 15:
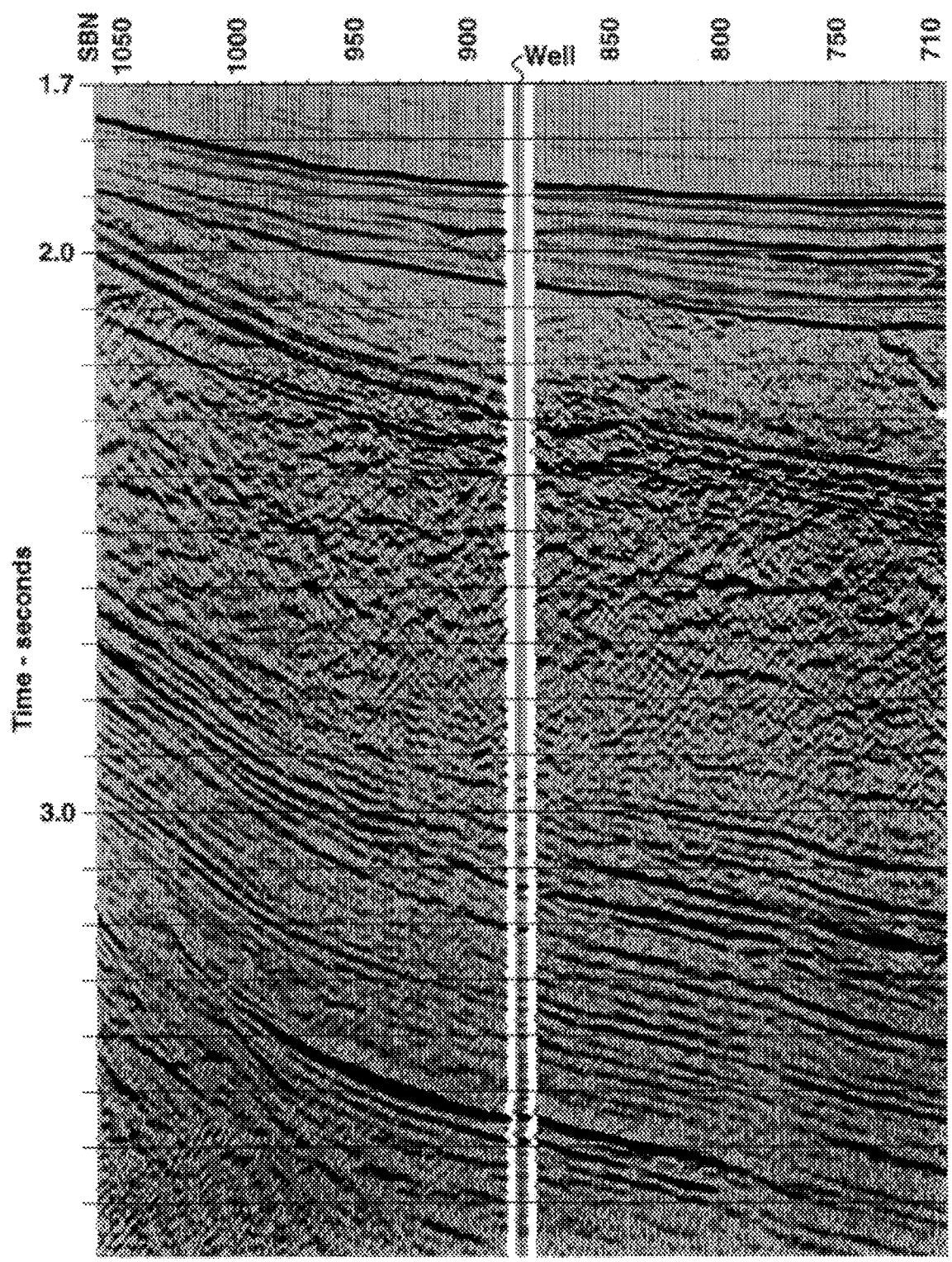

In this example, a 2-D seismic marine line is processed conventionally and according to the method of the present invention. Comparisons are then made to synthetic traces from a well on the seismic line and to VSP data. In this example, comparisons will also be made between:

(1) conventional seismic processing with automatic gain control (FIG. 13);

(2) processing without automatic gain control and without the gain method of the present invention (FIG. 14); and (3) processing with the gain method of the present invention (FIG. 15).

The seismic line utilized in this example is a 2-D seismic marine line having stacking bin numbers ("SBN") 700 to 1060. The well data is embedded at SBN 887.

(1) Conventional Seismic Processing With Automatic Gain Control (FIG. 13)

FIG. 13 shows the 2-D seismic marine line after conventional processing utilizing a prestack automatic gain control ("AGC") function. This line was processed utilizing conventional gain techniques, similar to that described in Example 1 above.

(2) Processing Without Automatic Gain Control and Without the Gain Method of the Present Invention (FIG. 14)

As displayed in FIG. 14, the marine data has not been subjected to the traditional gain functions nor the gain function of the present invention, but rather has been processed in a similar fashion as in Example 1(3) above. This FIG. 14 shows a section with shallow high amplitudes grading to lower amplitudes with increasing time. The seismic anomaly (SBN 883) at about 3.550 seconds, is lower in amplitude than the well synthetic trace data.

(3) Processing With the Gain Method of the Present Invention (FIG. 15)

FIG. 15 shows the marine seismic data, processed as described in Example 2(2) above that is further subjected to the gain function, gain(t), of the present invention. The seismic data is first transformed from amplitudes as a function of two way travel time to logarithms of the RMS values of the amplitudes versus two way travel time.

As with Example 1 above, various polynomial equations of the form $$\text{Log Amp}(t)=K_0+K_1t+K_2t^2+\ldots+K_Nt^N$$

wherein K's are various constants and t is the two-way travel time, and N is the order of the polymonial, are used to fit the data, varying in this example from 1st to sixth order.

A quadratic solution was found to be the best fit and was used to correct the seismic amplitudes and was as follows $$\text{poly}(t)=146.572-14.281t+1.661t^2.$$

As explained above, the decay function, decay(t) is equal to $e^{\text{poly}(t)}$ or $$(146.572-14.281t+1.661t^2)\,e$$

The gain function, gain(t), is equal to the inverse of the decay function or equal to $e^{-\text{poly}(t)}$ or $$-(146.572-14.281t+1.661t^2)\,e$$

Figure 16:
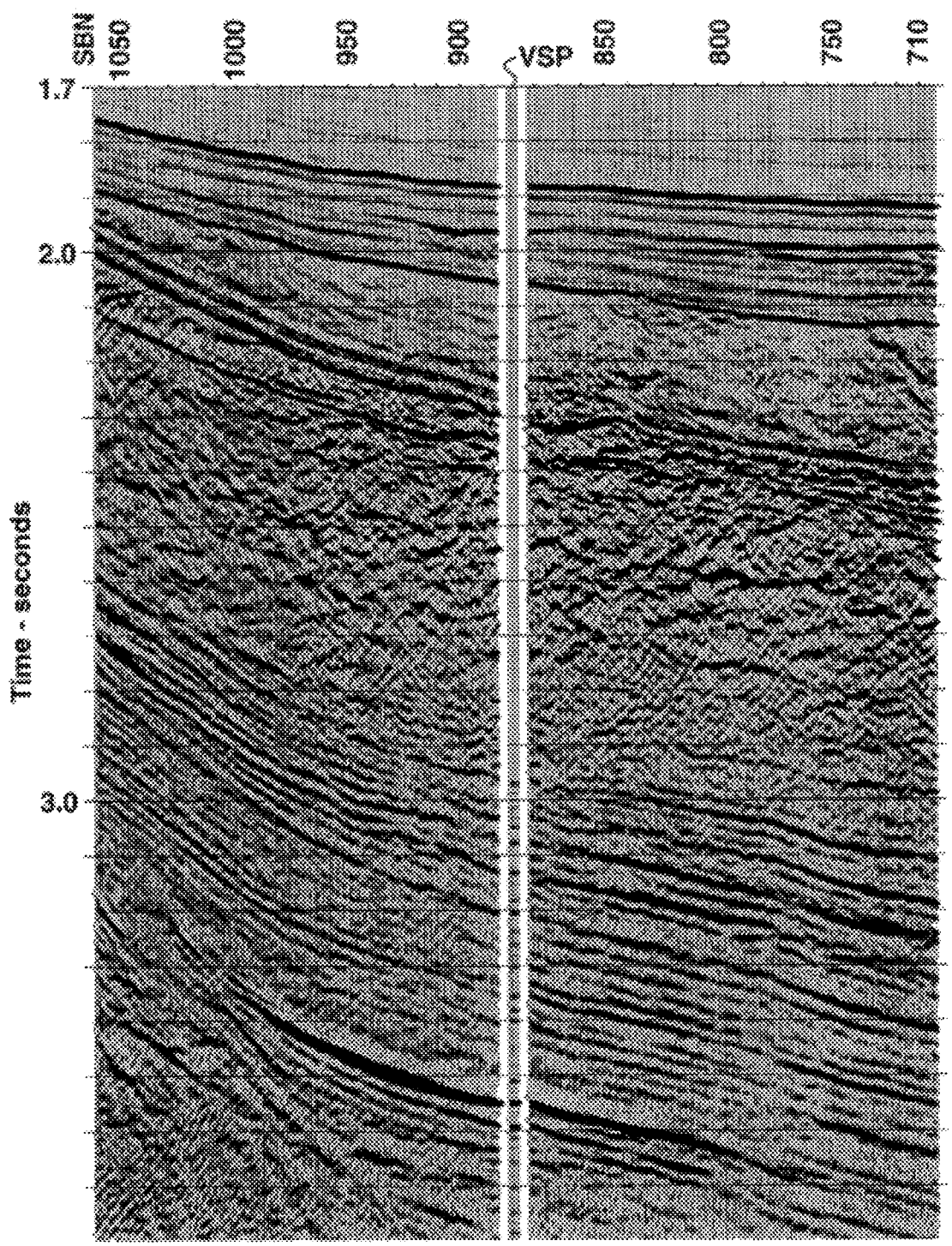
Figure 17A:
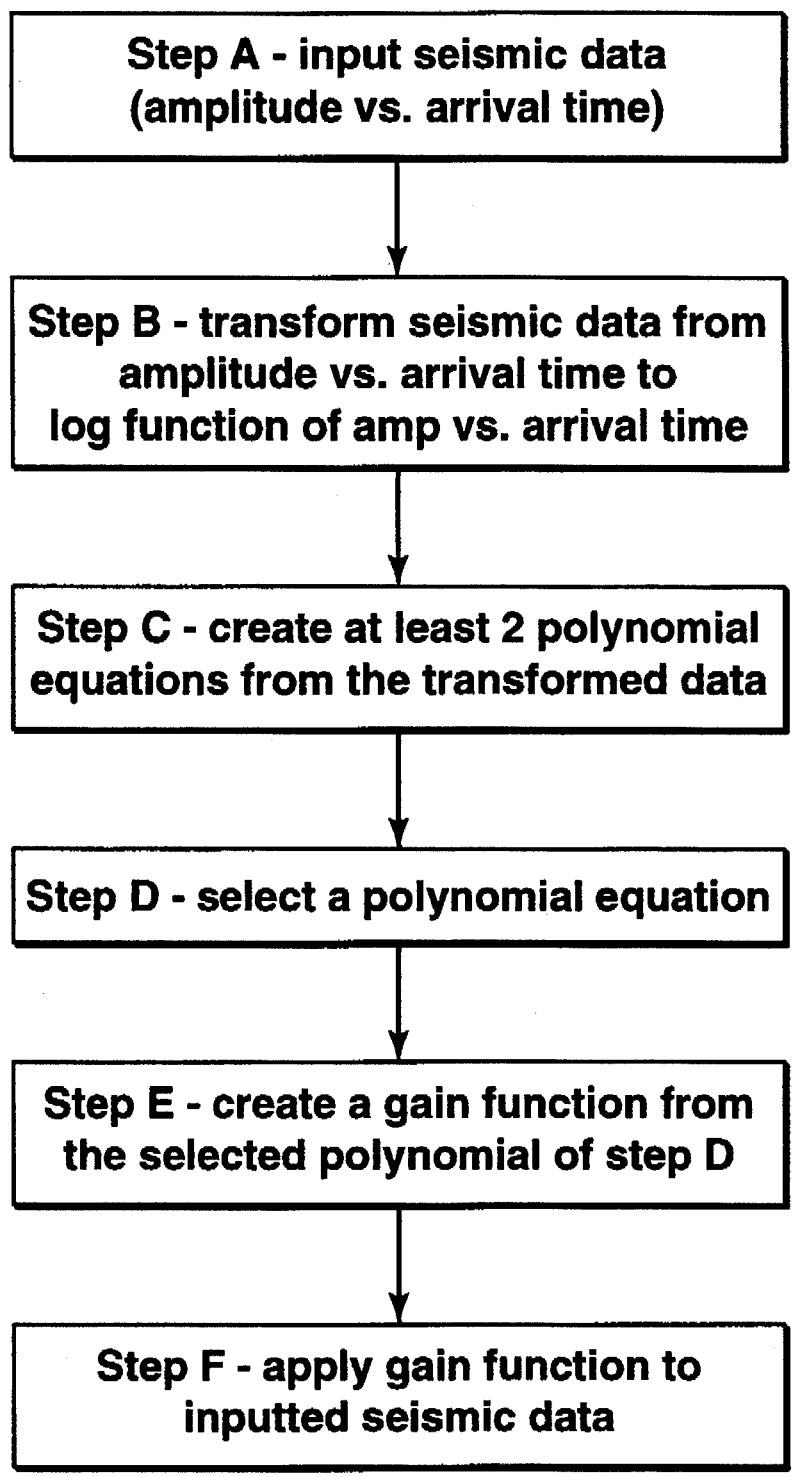
FIG. 17A, FIG. 17B and FIG. 17C are schematic flow diagrams of embodiments of the method of the present invention.
Figure 17B:
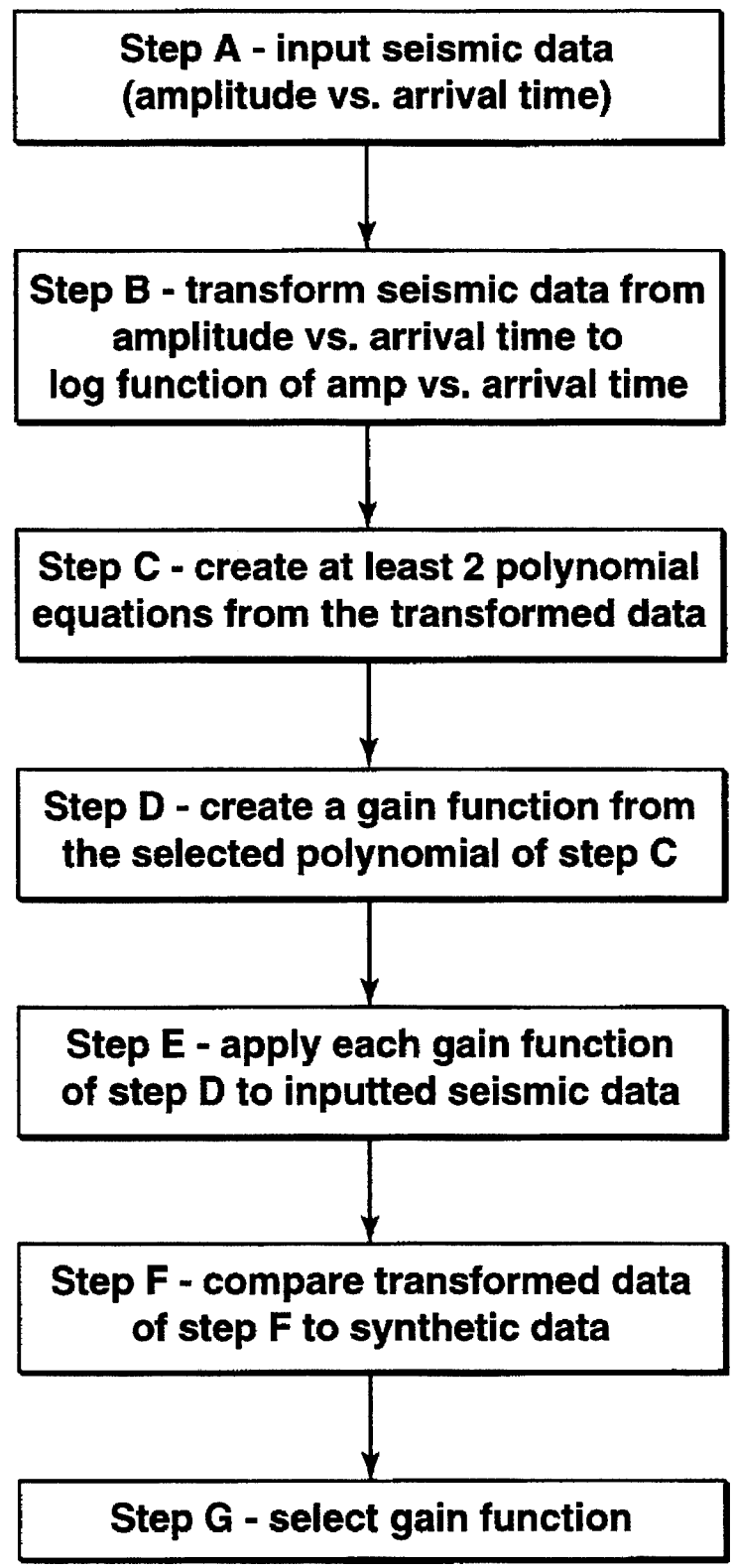
Figure 17C:
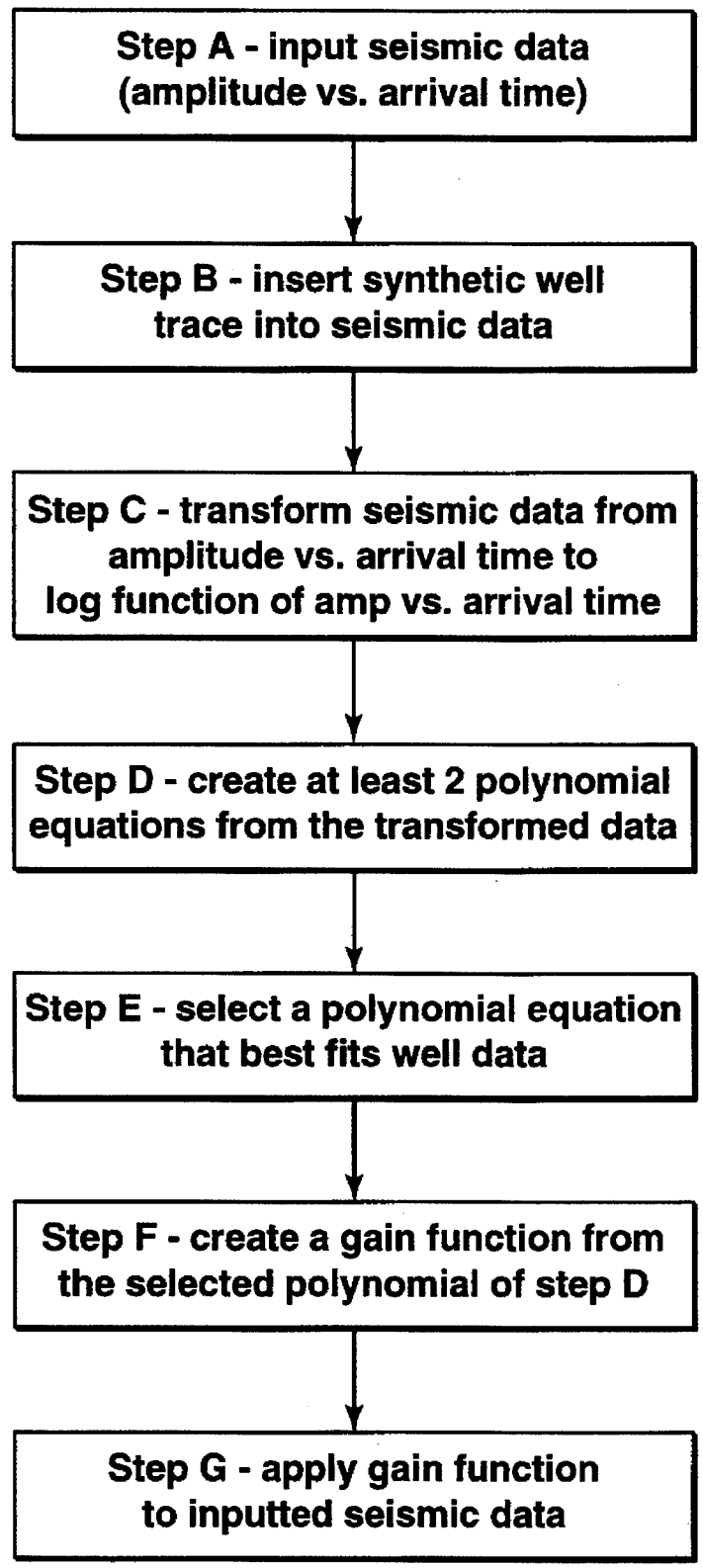

FIG. 16 shows the marine seismic data processed according to the method of the present invention, with VSP data inserted at SBN 887.

Comparison

The conventional processed section, FIG. 13, has a reasonable well-to-seismic tie, and indicates that hydrocarbon accumulation goes from a downdip position SBN 750 to an updip location of SBN 1000. FIG. 15, processed according to the present invention, indicates a more restricted reservoir from SBN 790 to SBN 990. While the gain function of the present invention is designed to preserve lateral changes in amplitude, the conventional processing uses automatic gain control ("AGC") to scale the data, which AGC process can alter lateral changes in seismic amplitude and creates the impression that the bed boundaries extend beyond their limits.

TABLE 2 is a comparison of the results of Example 2 (1)-(3), as described above. In the table, the processing results are correlated to the synthetic traces at W1 and to the VSP data, with results measured in percentage of correlation.

TABLE 2

Correlation Values In Percentage
At SBN 837 Along The Seismic Marine Line
For Various Processing Methods

| | Comparison At SBN 837 | |
|---|---|---|
| Processing Method Example No. | W1 SBN 837 | VSP SBN 837 |
| (1) Conventional | 63 | 57 |
| (2) w/o gain | 63 | 58 |
| (3) Invention | 68 | 61 |

As shown in Table 1, processing the 2-D seismic land line data with the method of the present invention yields a better correlation to both well synthetic data and VSP data than processing the data by conventional methods or without gain.

The description given herein is intended to illustrate the preferred embodiments of the present invention. It is possible for one of ordinary skill in the art to make various changes to the details of the present invention that are within the equivalent scope of the claimed invention, without departing from the spirit of this invention. Therefore, it is intended that all such variations be included within the scope of the present invention as claimed.

I claim:

1. A method of processing seismic data representing subsurface layers of a section of the earth to compensate for seismic transmission loss, wherein the data comprises reflection amplitude as a function of arrival time, and wherein the data has experienced seismic transmission loss, the method comprising:

(a) transforming the seismic data from reflection amplitude as a function of arrival time to the logarithms of the root mean squares of reflection amplitude versus arrival time;

(b) creating at least 2 polynomial equations that are functions of the logarithm of the root mean squares of reflection amplitude versus arrival time to approximate the transformed data of step (a);

(c) selecting a polynomial equation from the polynomial equations created in step (b);

(d) creating a gain function from the polynomial equation selected in step (c); and (e) transforming the seismic data by applying the gain function to the seismic data to transform the seismic data into transmission loss compensated seismic data.

2. The method of claim 1 wherein the order of the polynomial equations created in step (b) is in the range of about 2 to about 10.

3. The method of claim 1 wherein the polynomial selected in step (c) decreases with increasing time and becomes asymptotic with respect to time.

4. The method of step 1 wherein the polynomial equation selected in step (c) provides the smallest root mean squared error to the transformed data than the other polynomial equations of step (b).

5. The method of claim 1 wherein step (d) comprises creating a gain function by inverting the polynomial equation selected in step (c).

6. The method of claim 1 wherein the order of the polynomial equations created in step (b) is in the range of about 2 to about 10, wherein the polynomial equation selected in step (c) provides the smallest root mean squared error to the transformed data than the other polynomial equations of step (b), wherein the polynomial selected in step (c) decreases with increasing time and becomes asymptotic with respect to time; and wherein step (d) comprises creating a gain function by inverting the polynomial equation selected in step (c).

7. A method of processing seismic data representing subsurface layers of a section of the earth to produce a gain function for the seismic data to compensate for transmission loss, wherein the data comprises reflection amplitude as a function of arrival time, and wherein the data has experienced seismic transmission loss, the method comprising:

(a) transforming the seismic data from reflection amplitude as a function of arrival time to logarithms of the root mean squares of reflection amplitude versus arrival time;

(b) creating at least 2 polynomial equations that are functions of the logarithm of the root mean squares of reflection amplitude versus arrival time to approximate the transformed data of step (a), wherein at least one of the polynomial equations is at least a 2nd order polynomial equations;

(c) selecting a polynomial equation from the polynomial equations created in step (b); and (d) transforming the polynomial equation selected in step (c) into a gain function for compensating the seismic data for transmission loss.

8. The method of claim 7 wherein the order of the polynomial equations created in step (b) is in the range of about 2 to about 10.

9. The method of claim 7 wherein the polynomial selected in step (c) decreases with increasing time and becomes asymptotic with respect to time.

10. The method of claim 7 wherein the polynomial equation selected in step (c) provides the smallest root mean squared error to the transformed data than the other polynomial equations of step (b).

11. The method of claim 7 wherein step (d) comprises creating a gain function by inverting the polynomial equation selected in step (c).

12. The method of claim 7 wherein the order of the polynomial equations created in step (b) is in the range of about 2 to about 10, wherein the polynomial equation selected in step (c) provides the smallest root mean squared error to the transformed data than the other polynomial equations of step (b), wherein the polynomial selected in step (c) decreases with increasing time and becomes asymptotic with respect to time; and wherein step (d) comprises creating a gain function by inverting the polynomial equation selected in step (c).

13. A method of processing first seismic data representing subsurface layers of a section of the earth to create a gain function for the seismic data to compensate for transmission loss, wherein the data comprises reflection amplitude as a function of arrival time, wherein the data has experienced seismic transmission loss, and wherein a synthetic well trace data exists for the section, the method comprising:

(a) transforming the first seismic data from reflection amplitude as a function of arrival time to the logarithm of reflection amplitude versus arrival time;

(b) creating at least 2 polynomial equations that are functions of the logarithm of the root mean squares of reflection amplitude versus arrival time to approximate the transformed data of step (a);

(c) transforming each polynomial equation created in step (b) into a gain function for compensating the seismic data for transmission loss;

(d) transforming the seismic data with each gain function created in step (c) to transform the seismic data into transmission loss compensated seismic data;

(e) comparing the loss compensated seismic data of step (d) for each gain function with the synthetic well trace data;

(f) selecting the gain function yielding the closest comparison in step (e) between the transformed seismic data and the synthetic well trace data, to obtain a seismic loss compensating gain function for compensating the first seismic data for transmission loss.

14. The method of claim 13 wherein the order of the polynomial equations created step (b) is in the range of about 2 to about 10.

15. The method of claim 13 wherein the gain function of step (g) decreases with increasing time and becomes asymptotic with respect to time.

16. The method of claim 13 wherein the order of the polynomial equations created step (b) is in the range of about 2 to about 10, wherein the gain function selected in step (g) decreases with increasing time and becomes asymptotic with respect to time; and wherein step (c) comprises creating a gain function by inverting the polynomial equations of step (b).

17. A method of processing a first seismic data set representing subsurface layers of a section of the earth to create a gain function for the seismic data to compensate for transmission loss, wherein the data comprises reflection amplitude as a function of arrival time, wherein the data has experienced seismic transmission loss, and wherein a synthetic well trace data exists for the section, the method comprising:

(a) inserting the synthetic well trace data into the first seismic data set to transform the first seismic data set into a second seismic data set of reflection amplitude as a function of arrival time;

(b) transforming the second seismic data set from reflection amplitude as a function of arrival time to the logarithm of reflection amplitude versus arrival time;

(c) creating at least 2 polynomial equations that are functions of the logarithm of the root mean squares of reflection amplitude versus arrival time to approximate the transformed data of step (b);

(d) selecting a polynomial equation from the polynomial equations created in step (c); and (e) transforming the polynomial equation selected in step (d) into a gain function for compensating the first seismic data for transmission loss.

18. The method of claim 17 wherein the order of the polynomial equations created step (c) is in the range of about 2 to about 10, wherein the polynomial equation selected in step (d) provides the smallest root mean squared error to the transformed data than the other polynomial equations of step (c), wherein the polynomial selected in step (d) decreases with increasing time and becomes asymptotic with respect to time; and wherein step (e) comprises creating a gain function by inverting the polynomial equation selected in step (d).

19. The method of claim 17 further comprising:

(f) transforming the first seismic data set for transmission loss by applying the gain function to the first seismic data set to transform the first seismic data set into a transmission loss compensated seismic data set.

* * * * *